US011921977B2

United States Patent
Li et al.

(10) Patent No.: US 11,921,977 B2
(45) Date of Patent: Mar. 5, 2024

(54) PROCESSING METHOD FOR WAITING SCENARIO IN APPLICATION AND APPARATUS

(71) Applicant: Huawei Technologies Co., Ltd., Shenzhen (CN)

(72) Inventors: Wei Li, Shenzhen (CN); Xinghai Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 136 days.

(21) Appl. No.: 17/623,425

(22) PCT Filed: Jun. 29, 2020

(86) PCT No.: PCT/CN2020/098673
§ 371 (c)(1),
(2) Date: Dec. 28, 2021

(87) PCT Pub. No.: WO2021/000807
PCT Pub. Date: Jan. 7, 2021

(65) Prior Publication Data
US 2022/0350450 A1  Nov. 3, 2022

(30) Foreign Application Priority Data

Jun. 29, 2019 (CN) .......................... 201910581269.6

(51) Int. Cl.
*G06F 3/0482* (2013.01)
*G06F 3/04817* (2022.01)
(Continued)

(52) U.S. Cl.
CPC ........ *G06F 3/0482* (2013.01); *G06F 3/04817* (2013.01); *G06F 3/167* (2013.01); *G06F 9/451* (2018.02); *G06F 9/485* (2013.01)

(58) Field of Classification Search
None
See application file for complete search history.

(56) References Cited

U.S. PATENT DOCUMENTS 5,651,107 A * 7/1997 Frank .................... G06F 3/0481
345/589
6,429,883 B1 * 8/2002 Plow .................... G06F 3/0481
715/768
(Continued)

FOREIGN PATENT DOCUMENTS

CN 104050035 A 9/2014
CN 104679581 A 6/2015
(Continued)

OTHER PUBLICATIONS

Informit, "Android Programming: The Activity Lifecycle," Sep. 21, 2015, https://www.informit.com/articles/article.aspx?p=2432029.*

*Primary Examiner* — Ryan Barrett
(74) *Attorney, Agent, or Firm* — Conley Rose, P.C.

(57) ABSTRACT

A processing method comprises running a first application, displaying a first interface of the first application, wherein the first interface comprises waiting information, displaying, in response to running the first application, first information about a second application according to a first instruction of the waiting information, and continuing running the first application in a background, wherein a first running state of the first application in the background is consistent with a second running state of the first application in a foreground.

20 Claims, 19 Drawing Sheets

(51) Int. Cl.
*G06F 3/16* (2006.01)
*G06F 9/451* (2018.01)
*G06F 9/48* (2006.01)

(56) References Cited

U.S. PATENT DOCUMENTS

| | | | | |
|---|---|---|---|---|
| 6,670,970 | B1* | 12/2003 | Bonura | G06F 3/0484 |
| | | | | 345/592 |
| 8,015,494 | B1* | 9/2011 | Hull | G06F 3/0481 |
| | | | | 715/764 |
| 11,301,952 | B2* | 4/2022 | Zhao | G06F 9/485 |
| 2006/0236328 | A1* | 10/2006 | DeWitt | G06F 9/452 |
| | | | | 719/329 |
| 2009/0193364 | A1* | 7/2009 | Jarrett | G06F 3/04817 |
| | | | | 715/838 |
| 2011/0107212 | A1* | 5/2011 | Jeong | G06F 3/0481 |
| | | | | 715/702 |
| 2012/0081361 | A1* | 4/2012 | Woo | H04N 21/816 |
| | | | | 345/419 |
| 2013/0091446 | A1* | 4/2013 | Neralla | G06F 3/0481 |
| | | | | 715/763 |
| 2013/0104065 | A1* | 4/2013 | Stecher | G06F 3/04842 |
| | | | | 715/767 |
| 2013/0145313 | A1* | 6/2013 | Roh | G06F 3/04817 |
| | | | | 715/802 |
| 2013/0162667 | A1* | 6/2013 | Eskolin | G09G 5/14 |
| | | | | 345/619 |
| 2014/0157166 | A1* | 6/2014 | Choi | G06F 3/04817 |
| | | | | 715/769 |
| 2014/0282272 | A1* | 9/2014 | Kies | G06F 3/017 |
| | | | | 715/863 |
| 2014/0298262 | A1* | 10/2014 | Hagens | G06F 3/04842 |
| | | | | 715/814 |
| 2015/0007201 | A1 | 1/2015 | Cho | |
| 2015/0333971 | A1 | 11/2015 | Wang et al. | |
| 2016/0357413 | A1* | 12/2016 | Block | G06F 3/04845 |
| 2016/0360382 | A1* | 12/2016 | Gross | G06F 9/453 |
| 2017/0329615 | A1* | 11/2017 | Kahn | G06F 9/451 |
| 2020/0167173 | A1* | 5/2020 | Wang | G06F 3/04817 |
| 2020/0241746 | A1 | 7/2020 | Chen et al. | |
| 2020/0310627 | A1 | 10/2020 | Ning et al. | |
| 2020/0341603 | A1* | 10/2020 | Li | G06F 9/451 |
| 2020/0380752 | A1* | 12/2020 | Fu | G09G 5/00 |
| 2021/0034223 | A1* | 2/2021 | Sun | G06F 3/147 |
| 2021/0109644 | A1* | 4/2021 | Chen | G06F 9/451 |
| 2021/0271384 | A1* | 9/2021 | Shin | G06F 3/016 |
| 2023/0038036 | A1* | 2/2023 | Choi | G06F 3/04847 |

FOREIGN PATENT DOCUMENTS

| | | |
|---|---|---|
| CN | 105791932 A | 7/2016 |
| CN | 106658115 A | 5/2017 |
| CN | 107154972 A | 9/2017 |
| CN | 107707768 A | 2/2018 |
| CN | 108021321 A | 5/2018 |
| CN | 108093036 A | 5/2018 |
| CN | 108170342 A | 6/2018 |
| CN | 108184021 A | 6/2018 |
| CN | 108521607 A | 9/2018 |
| CN | 109739630 A | 5/2019 |
| CN | 110489215 A | 11/2019 |
| IN | 109379337 A | 2/2019 |
| WO | 2019080511 A1 | 5/2019 |
| WO | 2019114828 A1 | 6/2019 |

* cited by examiner

PROCESSING METHOD FOR WAITING SCENARIO IN APPLICATION AND APPARATUS

CROSS-REFERENCE TO RELATED APPLICATIONS

This is a U.S. National Stage of International Patent Application No. PCT/CN2020/098673 filed on Jun. 29, 2020, which claims priority to Chinese Patent Application No. 201910581269.6 filed on Jun. 29, 2019. Both of the aforementioned applications are hereby incorporated by reference in their entireties.

TECHNICAL FIELD

Embodiments of this application relate to the field of communications technologies, and in particular, to a processing method for a waiting scenario in an application and an apparatus.

BACKGROUND

Currently, when operating an application in a terminal device, a user often encounters some scenarios in which the user needs to wait (for example, game matching, follow-up parachuting, and protagonist death). The user expects to handle other interested operations (for example, browsing a web page) in a waiting scenario, to fully use time. However, if a game application includes a waiting scenario, when the user switches from the game application to a web page for browsing, the game application is directly suspended. When the game application is switched to the foreground, the game application needs to continue to wait from a previous switch-out time point or needs to be reconnected to a server. As a result, time utilization of the user is low, and user experience is poor in the waiting scenario.

SUMMARY

Embodiments of this application provide a processing method for a waiting scenario in an application and an apparatus, to improve time utilization and user experience in the waiting scenario.

According to a first aspect of the embodiments of this application, a processing method for a waiting scenario in an application is provided. The method includes: An electronic device runs a first application; the electronic device displays a first interface of the first application, where the first interface includes waiting information; in response to the first application, the electronic device displays information about a second application according to a first instruction of the waiting information; and the electronic device continues running the first application in the background, where a running state of the first application in the background is consistent with a running state of the first application in the foreground. Based on this solution, waiting start time of the first application is learned by using the first application. Compared with the conventional technology in which the waiting start time is learned by monitoring the first application in real time, in this solution, system overheads are small, and system performance is improved. In addition, when waiting starts, the information about the second application may be displayed according to the first instruction of the waiting information. In other words, the electronic device may directly switch from an interface of the first application to an interface of the second application, without first switching the interface of the first application to a main interface and switching the main interface to the interface of the second application as in the conventional technology. Therefore, a quantity of interface switching times is small, a user operation is convenient, and user experience is improved. In addition, in this embodiment, when the electronic device runs the first application in the background, the running state of the first application is consistent with the running state of the first application in the foreground. When the first application is run in the background, remaining waiting duration of the first application is not suspended. Therefore, when the second application is run in the foreground, the remaining waiting duration of the first application may continue performing in the background. Therefore, the waiting duration of the first application can be effectively used, and time utilization of the user is improved.

It may be understood that the running state of the first application in the background is consistent with the running state of the first application in the foreground means that when the first application is run in the background, the remaining waiting duration of the first application is not suspended, but may continue counting down in the background like the running state of the first application in the foreground. For example, when the retraining waiting duration in a countdown icon of the first application is 20 seconds, the electronic device runs the second application in the foreground, and the first application is switched to the background for running. When the electronic device switches the first application to the foreground again for running alter running the second application in the foreground for 10 seconds, the remaining waiting duration in the countdown icon of the first application is 10 seconds. In other words, when the first application is run in the background, the remaining waiting duration in the countdown icon of the first application does not stop, but may continue counting down in the background.

With reference to the first aspect, in a possible implementation, that the electronic device continues running the first application in the background includes: The electronic device intercepts a pause (PAUSE) command transmitted to the first application; or the electronic device transmits a second instruction to the first application, where the second instruction is used to instruct the first application to continue running based on the running state in the foreground. Based on this solution, the PAUSE command may be intercepted or the second instruction may be transmitted to the first application, so that the running state of the first application in the background is consistent with the running state of the first application in the foreground.

With reference to any one of the first aspect or the possible implementation of the first aspect, in another possible implementation, the information about the second application refers to a second interface of the second application. Based on this solution, the electronic device may directly switch the first application to the second application, and display the second interface of the second application.

With reference to any one of the first aspect or the possible implementation of the first aspect, in another possible implementation, the information about the second application refers to an icon of the second application, and the method further includes: The electronic device receives a selection operation performed by a user on the icon of the second application; and the electronic device displays a second interface of the second application in response to the selection operation of the user. Based on this solution, the electronic device may display the icon of the second application in the first application, and after receiving a tap operation performed by the user on the second application, display the second interface of the second application. It may be understood that, in this solution, when the interface of the first application is switched to the interface of the second application, there is no need to first switch from the first interface of the first application to the main interface, and then switch from the main interface to the interface of the second application. Therefore, a quantity of interface switching times is small, and user experience is good.

With reference to any one of the first aspect or the possible implementations of the first aspect, in another possible implementation, the second interface further includes the waiting information. Based on this solution, when the electronic device runs the second application in the foreground, the interface of the second application may display the waiting information, so that the user learns remaining waiting duration of the current first application.

With reference to any one of the first aspect or the possible implementations of the first aspect, in another possible implementation, the method further includes: The electronic device displays information about the first application when the remaining waiting duration ends. Based on this solution, after the waiting duration of the first application ends, the electronic device may switch the second application to the first application.

With reference to any one of the first aspect or the possible implementations of the first aspect, in another possible implementation, the information about the first application refers to a display interface of the first application after the remaining waiting duration of the first interface ends. Based on this solution, after the remaining waiting duration of the first application ends, the electronic device displays the display interface of the first application after the remaining waiting duration of the first application ends, and the second application is switched to the background for running.

With reference to any one of the first aspect or the possible implementations of the first aspect, in another possible implementation, the information about the first application refers to an icon of the first application, and the method further includes: The electronic device receives a tap operation performed by the user on the icon of the first application; and in response to the tap operation performed by the user on the icon of the first application, the electronic device displays a display interface of the first application after the remaining waiting duration of the first interface ends. Based on this solution, after the remaining waiting duration of the first application ends, the electronic device displays the icon of the first application, and after receiving the tap operation performed by the user on the icon of the first application, the electronic device displays the display interface of the first application after the remaining waiting duration of the first application ends.

With reference to any one of the first aspect or the possible implementations of the first aspect, in another possible implementation, the first instruction includes the remaining waiting duration; or the method further includes: The electronic device identifies the waiting information in the first interface, and determines the remaining waiting duration. Based on this solution, the remaining waiting duration may be obtained by identifying the waiting information in the first interface.

With reference to any one of the first aspect or the possible implementations of the first aspect, in another possible implementation, the second application is an application that is run by the electronic device in the background; or the second application is an application that is in the electronic device and whose quantity of running times or running duration within preset time is greater than a preset threshold; or the second application is an application preconfigured in the electronic device. Based on this solution, the second application may be an application running in the background, or may be an application that is run for a large quantity of times or that is run for long duration, or may be an application preset by the user. This is not limited in this application.

With reference to any one of the first aspect or the possible implementations of the first aspect, in another possible implementation, when the first application is run in the background, the electronic device does not kill a process corresponding to the first application. Based on this solution, when the first application is run in the background, the first application s not killed by a system, and may be kept alive in the background.

With reference to any one of the first aspect or the possible implementations of the first aspect, in another possible implementation, when the first application is run in the background, the method further includes: The electronic device plays audio information of the first application. Based on this solution, the first application is run in the background, and the electronic device may play the audio information of the first application. Optically, the electronic device may also play audio information of the second application.

With reference to any one of the first aspect or the possible implementations of the first aspect, in another possible implementation, the waiting information includes a countdown icon, waiting duration text information, or pause information. Based on this solution, the waiting information may include a plurality of forms. This is not limited in this application.

According to a second aspect of the embodiments of this application, a processing method for a waiting scenario in an application is provided. The method includes: An electronic device runs a first application; the electronic device displays a first interface of the first application, where the first interface includes waiting information; the electronic device receives a first operation of a user, where the first operation is used to enable a function of continuing running in the background, and the function of continuing running in the background means that a running state of the first application in the background is consistent with a running state of the first application in the foreground; the electronic device displays information about a second application in response to the first operation; and the electronic device continues running the first application in the background, where the running state of the first application in the background is consistent with the running state of the first application in the foreground. Based on this solution, by receiving the first operation of the user and displaying the information about the second application, the electronic device may directly switch from an interface of the first application to an interface of the second application, without first switching the interface of the first application to a main interface and switching the main interface to the interface of the second application as in the conventional technology. Therefore, a quantity of interface switching times is small, a user operation is convenient, and user experience is improved. In addition in this embodiment, when the electronic device runs the first application in the background, the running state of the first application is consistent with the running state of the first application in the foreground, and remaining waiting duration of the first application is not suspended. Therefore, when the second application is run in the foreground, the remaining waiting duration of the first application may continue performing in the background. Therefore, the waiting duration of the first application can be effectively used, and time utilization of the user is improved.

With reference to the second aspect, in a possible implementation, that the electronic device continues running the lint application in the background includes: The electronic device intercepts a pause (PAUSE) command transmitted to the first application; or the electronic device transmits a first instruction the first application, where the first instruction is used to instruct the first application to continue running based on the running state in the foreground. Based on this solution, the PAUSE command may be intercepted or the first instruction may be transmitted to the first application, so that the running state of the first application in the background is consistent with the running state of the first application in the foreground.

With reference to any one of the second aspect or the possible implementation of the second aspect, in another possible implementation, the information about the second application refers to a second interface of the second application. Based on this solution, the electronic device may directly switch the first application to the second application, and display the second interface of the second application.

With reference to any one of the second aspect or the possible implementation of the second aspect, in another possible implementation, the information about the second application refers to an icon of the second application, and the method further includes: The electronic device receives a selection operation performed by the user on the icon of the second application; and the electronic device displays a second interface of the second application in response to the selection operation of the user. Based on this solution, the electronic device may display the icon of the second application in the first application, and after receiving a tap operation performed by the user on the second application, display the second interface of the second application.

With reference to any one of the second aspect or the possible implementations of the second aspect, in another possible implementation, the second interface further includes the waiting information. Based on this solution, when the electronic device runs the second application in the foreground, the interface of the second application may display the waiting information, so that the user learns remaining waiting duration of the current first application.

With reference to any one of the second aspect or the possible implementations of the second aspect, in another possible implementation, the method further includes: The electronic device displays information about the first application when the remaining waiting duration ends. Based on this solution, after the waiting duration of the first application ends, the electronic device may switch the second application to the first application.

With reference to any one of the second aspect or the possible implementations of the second aspect, in another possible implementation, the information about the first application refers to a display interface of the first application after the remaining waiting duration of the first interface ends. Based on this solution, after the remaining waiting duration of the first application ends, the electronic device displays the display interface of the first application after the remaining waiting duration of the first application ends, and the second application is switched to the background for running.

With reference to any one of the second aspect or the possible implementations of the second aspect, in another possible implementation, the information about the first application refers to an icon of the first application, and the method further includes: The electronic device receives a tap operation performed by the user on the icon of the first application; and in response to the tap operation performed by the user on the icon of the first application, the electronic device displays a display interface of the first application after the remaining waiting duration of the first interface ends. Based on this solution, after the remaining waiting duration of the first application ends, the electronic device displays the icon of the first application, and after receiving the tap operation performed by the user on the icon of the first application, the electronic device displays the display interface of the first application after the remaining waiting duration of the first application ends.

With reference to any one of the second aspect or the possible implementations of the second aspect, in another possible implementation, the method further includes: The electronic device identifies the waiting information in the first interface, and determines the remaining waiting duration. Based on this solution, the remaining waiting duration may be obtained by identifying the waiting information in the first interface.

With reference to any one of the second aspect or the possible implementations of the second aspect, in another possible implementation, the second application is an application that is run by the electronic device in the background; or the second application is an application that is in the electronic device and whose quantity of running times or miming duration within preset time is greater thins a preset threshold; or the second application is an application preconfigured in the electronic device. Based on this solution, the second application may be an application running in the background, or may be an application that is run for a large quantity of times or that is run for long duration, or may be an application preset by the user. This is not limited in this application.

With reference to any one of the second aspect or the possible implementations of the second aspect, in another possible implementation, when the first application is run in the background, the electronic device does not kill a process corresponding to the first application. Based on this solution, when the first application is run in the background, the first application is not killed by a system, and may be kept alive in the background.

With reference to any one of the second aspect or the possible implementations of the second aspect, in another possible implementation, when the first application is run in the background, the method further includes: The electronic device plays audio information of the first application. Based on this solution, the first application is run in the background, and the electronic device may play the audio information of the first application. Optionally, the electronic device may also play audio information of the second application.

With reference to any one of the second aspect or the possible implementations of the second aspect, in another possible implementation, the waiting information includes a countdown icon, waiting duration text information, or pause information. Based on this solution, the waiting information may include a plurality of forms. This is not limited in this application.

According to a third aspect of the embodiments of this application, an embodiment of this application provides an electronic device. The electronic device may implement the processing method for a waiting scenario in an application according to the first aspect. The electronic device may implement the foregoing method by using software, hardware, or executing corresponding software by using hardware. In a possible design, the electronic device may include a processor and a memory. The processor is configured to support the electronic device in performing corresponding functions in the method in the first aspect or the second aspect. The memory is configured to be coupled to the processor, and stores program instructions and data that are necessary for the electronic device.

According to a fourth aspect of the embodiments of this application, an embodiment of this application provides a computer storage medium. The computer storage medium includes computer instructions, and when the computer instructions are run on an electronic device, the electronic device performs the processing method for a waiting scenario in an application according to any one of the foregoing aspects and the possible design manners of the foregoing aspects.

According to a fifth aspect of the embodiments of this application, an embodiment of this application provides a computer program product. When the computer program product runs on a computer, the computer is enabled to perform the processing method for a waiting scenario in an application according to any one of the foregoing aspects and the possible design manners of the foregoing aspects.

For effect descriptions of the third aspect, the fourth aspect, and the fifth aspect, refer to descriptions of corresponding effects of the first aspect and the second aspect. Details are not described herein again.

DESCRIPTION OF EMBODIMENTS

The following describes the technical solutions in the embodiments of this application with reference to the accompanying drawings in the embodiments of this application. In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the follow items (pieces)" or a similar expression thereof means any combination of the items, including any combination of one item (piece) or a plurality of items (pieces). For example, at least one (piece) of a, b, or c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence. For example, "first" in a first application and "second" in a second application in the embodiments of this application are only used to distinguish between different applications. Descriptions such as "first", "second" in the embodiments of this application are merely used for indicating and distinguishing between described objects, do not show a sequence, do not indicate a specific limitation on a quantity of devices in the embodiments of this application, and do not constitute any limitation on the embodiments of this application.

It should be noted that, in this application, the term such as "example" or "for example" is used to represent giving an example, an illustration, or descriptions. Any embodiment or design described as an "example" or "for example" in this application should not be explained as being more preferred or having more advantages than another embodiment or design. Specifically, use of "example" or "for example" is intended to present a relative concept in a specific manner.

Figure 1A:
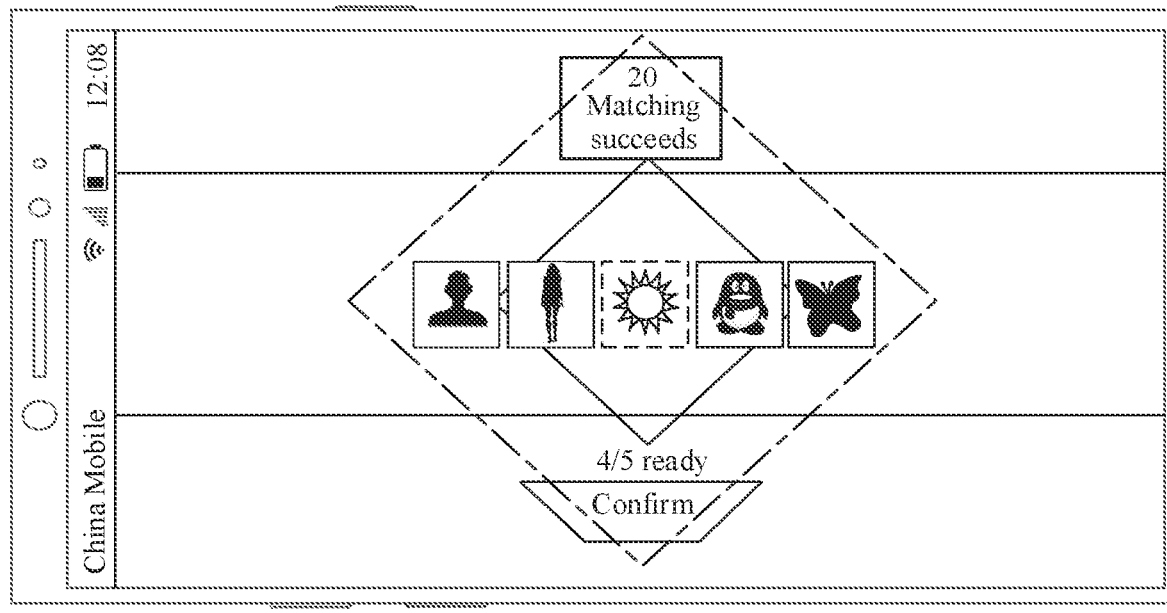
FIG. 1A is a schematic diagram 1 of a scenario instance of a processing method for a waiting scenario in an application according to an embodiment of this application.
Figure 1B:
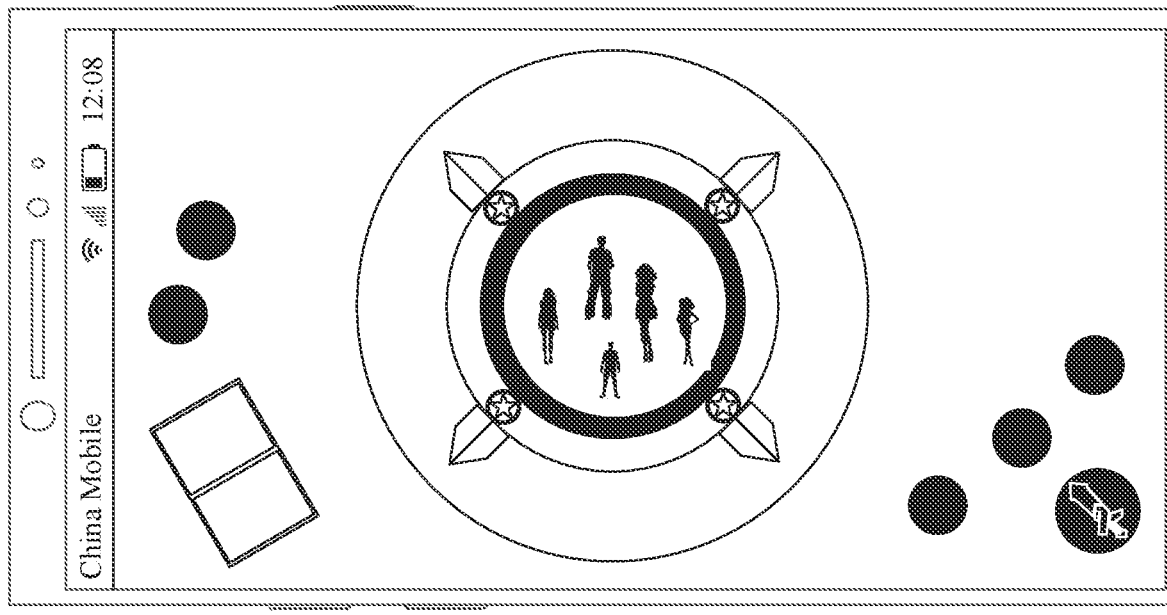
FIG. 1B is a schematic diagram 2 of a scenario instance of a processing method for a waiting scenario in an application according to an embodiment of this application.

An embodiment of this application provides a processing method for a waiting scenario in an application. The waiting scenario means that an interface of an application running on an electronic device includes waiting information, and the waiting information be a countdown icon, for example, scenarios in a game application such as game matching, follow-up parachuting, and protagonist death. As shown in FIG. 1A, when a game matches, a user needs to wait for an opponent player to join the game. In this case, the electronic device displays an interface that is of the game application and that includes the countdown icon, where the countdown icon includes waiting time. After all players join the game and the match succeeds, a game start interface shown in FIG. 1B may be entered.

Figure 1C:
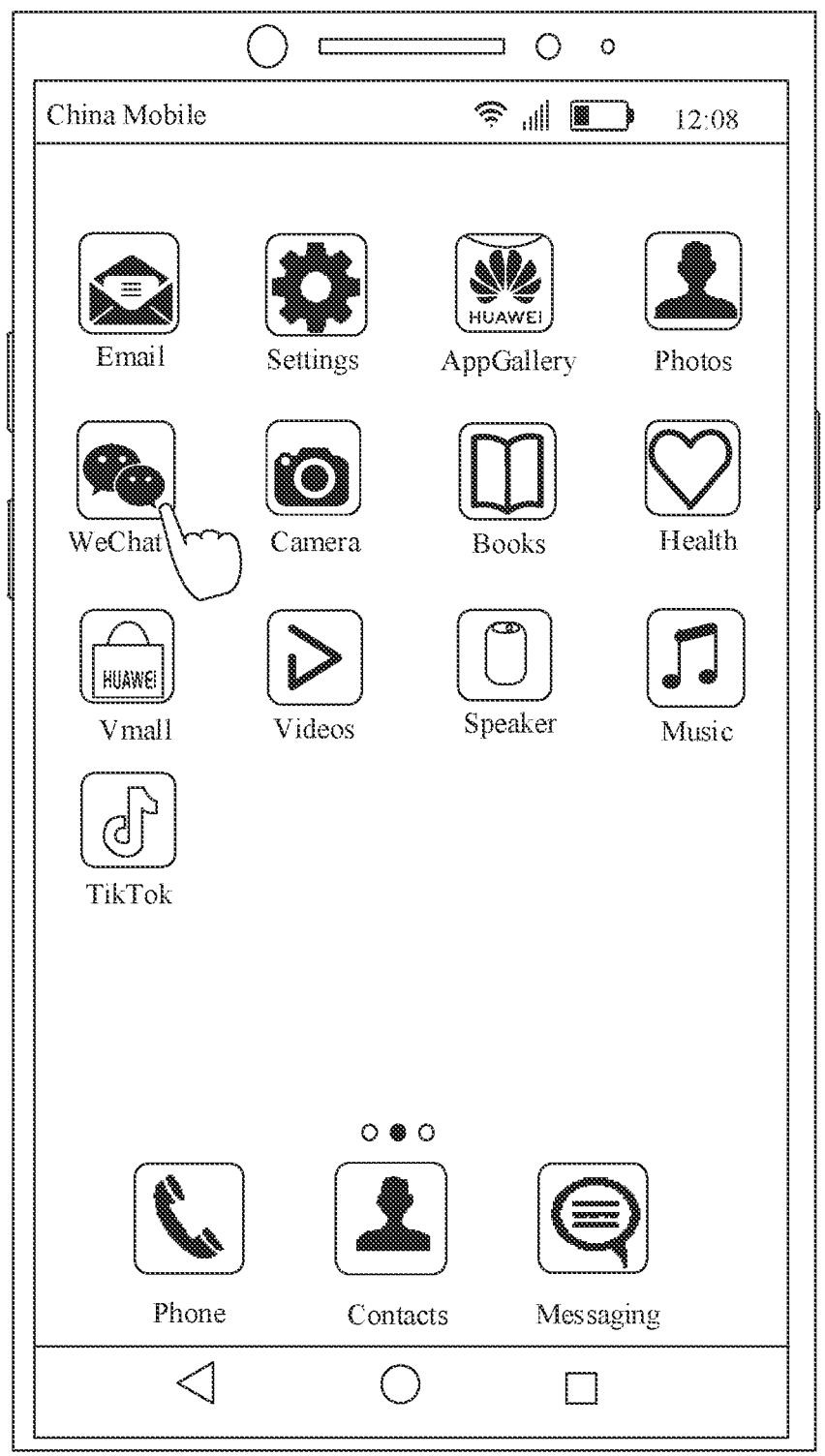
FIG. 1C is a schematic diagram 3 of a scenario instance of a processing method for a waiting scenario in an application according to an embodiment of this application.
Figure 1D:
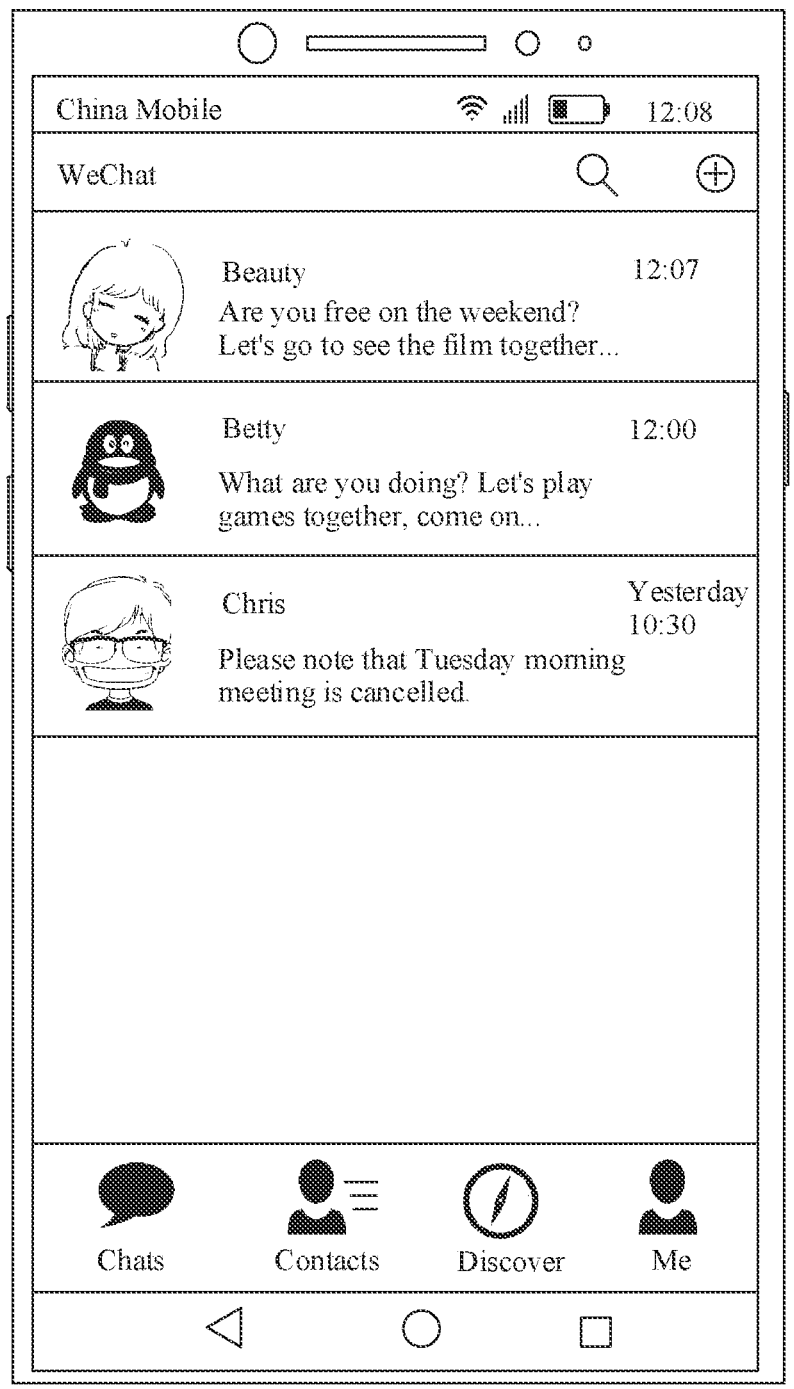
FIG. 1D is a schematic diagram 4 of a scenario instance of a processing method for a waiting scenario in an application according to an embodiment of this application.

If the user wants to process another interested operation (for example, chatting on WeChat) while waiting, the user may enter a touch indication in an interface in FIG. 1A, and the touch indication is used to switch a display interface of the electronic device to a main interface (home screen). After receiving the touch operation of the user, the electronic device displays a main interface in FIG. 1C in response to the touch operation, and switches the application in FIG. 1A to run in the background. When the user taps a WeChat icon, the electronic device receives a tap operation performed by the user on the WeChat icon, and the electronic device displays an interface in FIG. 1D in response to the tap operation. When the user wants to return to the interface of the game application again, the electronic device may display the interface of the game application in FIG. 1E in response to the touch operation of the user.

Figure 1E:
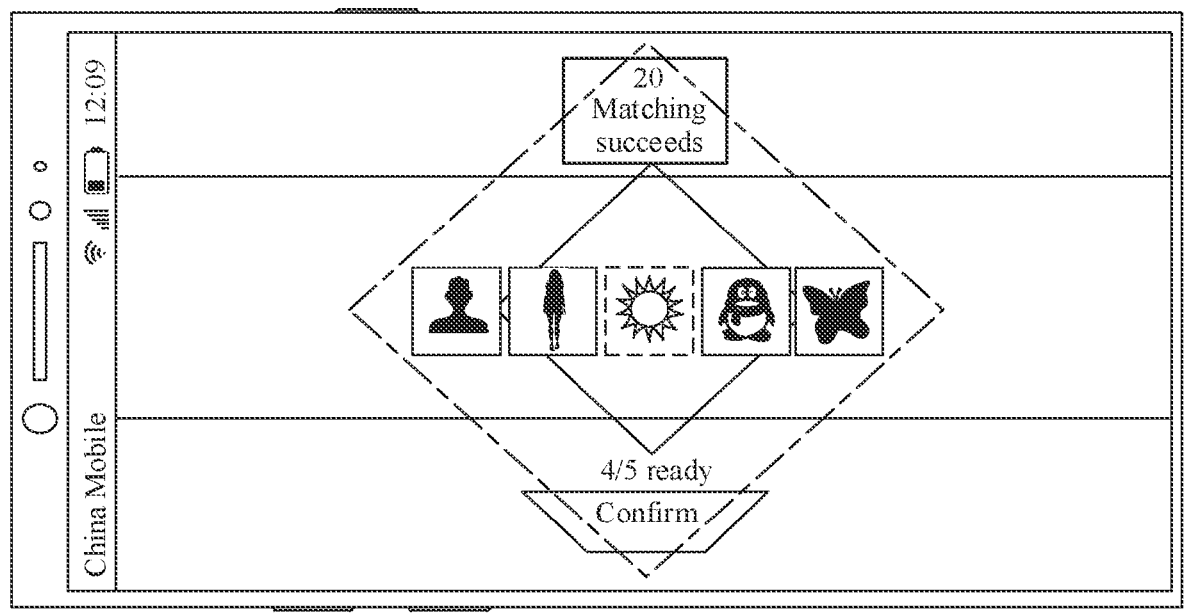
FIG. 1E is a schematic diagram 5 of a scenario instance of a processing method for a waiting scenario in an application according to an embodiment of this application.

With reference to FIG. 1A and FIG. 1E, when the interface of the game application is a waiting interface (waiting for 20 seconds), the electronic device returns to the main interface, and when selecting to tap the "WeChat" icon on the main interface, the electronic device runs "WeChat" in the foreground in response to the tap operation of the user on "WeChat". In this case, the game application is switched to the background for running. When the user switches the game application to the foreground again for running, the user still needs to wait from a switched-out time point (wait for 20 seconds). In other words, when the electronic device runs the game application in the background, the waiting time of the game application is paused, and the waiting time is paused at 20 seconds. When the electronic device switches the game application to the foreground again after running WeChat in the foreground for 1 minute, the waiting time of the game application continues counting down from 20 seconds.

It may be understood that, in the foregoing solution, when a countdown of the game application does not stop, the electronic device cannot run another interested service of the user in the foreground. As a result, utilization of the waiting time in the game application is low, and user experience is poor. In addition, in the foregoing solution, when switching from one application to another application, an interface of the application needs to be first switched back to the main interface, and then switched from the main interface to an interface of the another application. A large quantity of interface switching times leads to poor user experience.

Particularly, when the game application is in full screen, if there is an anti-accidental touch algorithm, it is difficult to switch from a full screen game application interface to the main interface, and may cause a problem that the user needs to perform a plurality of operations when switching from the full screen interface to the main interface, resulting in poor user experience.

To avoid a time waste caused by the user simply waiting for playing an advertisement in a video, in an existing solution, video content played by a video application is monitored when the video application is run, and when the video content is the advertisement, a switching instruction that is entered by the user and that is for switching the video application to the background for running is detected. If the switching instruction is detected, the video application is controlled to switch to the background for running, and a service program that performs a kill operation is notified to skip a target process corresponding to the video application. For example, when detecting that the video content is the advertisement, the user may enter the switching instruction (for example, a home button). The electronic device receives the switching instruction of the user. The electronic device runs the video application in the background in response to the switching instruction of the user, and does not kill the target process corresponding to the video application. This solution needs to detect whether the video content is the advertisement in real time, and system overheads are high. In addition, in this solution, when the advertisement is played by the video application, if another interested service of the user (for example, WeChat) is run in the foreground, the user first needs to press the home button, said the electronic device displays the main interface (home screen) in response to the home button pressed by the user. The user then taps the WeChat icon, and the electronic device displays a WeChat interface in response to the tap operation performed by the user on the WeChat icon. In other words, in this solution, when switching from the video application to the interface of the WeChat application, the user needs to first switch from the video application to the main interface, and then switch from the main interface to the WeChat interface. The switching is complex, and the user needs to perform a plurality of operations, which is troublesome.

When the electronic device runs an application, an Android (Android) system keeps an application process for as long as possible. When the process exits, the process is not immediately killed (killed) by the system. Instead, when memory of the Android system is insufficient, to ensure system smoothness, the system kills some processes based on priorities to reclaim memory to create a process or run a more important process. The Android system may determine which process to kill based on relative importance of processes of different applications to the user. Background keepalive means that a process can stay alive in the background and not be killed. For example, when the WeChat application is run in the background, the WeChat application may still receive a message sent by another electronic device. When the WeChat application is run in the background, if system memory is insufficient, other processes in the WeChat application may be killed, and only a process that receives a message is kept alive. It may be understood that a method for keeping a process alive is that the system does not kill the process, that is, the system indicates the service program that performs the kill operation skip a target process.

It should be noted that when an application is run m the background, the system keeps a process of the application alive, which does not mean that the application can continue running in the background. For example, the video application is used as an example. When the video application is played for 30 minutes, the electronic device runs another application in the foreground, and the video application is switched to the background for running. If the system memory is insufficient, the system may kill the video application. When the video application after killing is run in the foreground again, the electronic device displays a main interface of the video application. If the user needs to continue watching the foregoing video, the user needs to search for the video again and tap to play. When the system keeps the video application alive in the background, when the electronic device switches the video application to the foreground again after running another application in the foreground for a period of time, the video application continues playing from 30 minutes. Therefore, when an application is run in the background, the system keeps a process of the application alive, which can only ensure that the process of the application is not killed, but cannot ensure that the application continues running in the background.

Therefore, in the solution in the conventional technology, when switching the video application to the background for running, the electronic device does not kill the target process corresponding to the video application, which can only ensure that the video application is kept alive in the background, and cannot ensure that the advertisement of the video application continues playing when the electronic device runs the video application in the background. Therefore, the foregoing solution cannot improve time utilization of the advertisement in the video.

To improve time utilization of a waiting scenario in an application, reduce a quantity of interface switching times, and improve user experience, the embodiments of this application provide a processing method for a waiting scenario in an application. In the method, in a scenario in which a first application needs to wait for a countdown, a second application can be run in the foreground, the first application can be run in the background, and the countdown of the first application does not stop when the first application is run in the background. Therefore, waiting time of the first application can be fully utilized, and time utilization of a user can be improved. In addition, an interface of the first application can be quickly switched to an interface of the second application, which reduces a quantity of interface switching times, and improves user experience.

For example, the method provided in the embodiments of this application may be applied to a waiting interface of a game application, for example, interfaces including countdown cons such as game matching, follow-up parachuting, and protagonist death. The method may also be applied to a waiting interface in a playing process of a video application, for example, an interface that includes a countdown icon such as advertisement playing. The method may be further applied to another application including a waiting interface. A specific scenario of the waiting interface is not limited in the embodiments of this application. The following embodiments only use the waiting interface of game matching in the game application as an example, to describe the solution provided in this application.

An electronic device in the embodiments of this application may be a device including a foldable screen such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device/a virtual reality (virtual reality, VR) device. A specific form of the electronic device is not specifically limited in the embodiments of this application.

Figure 2:
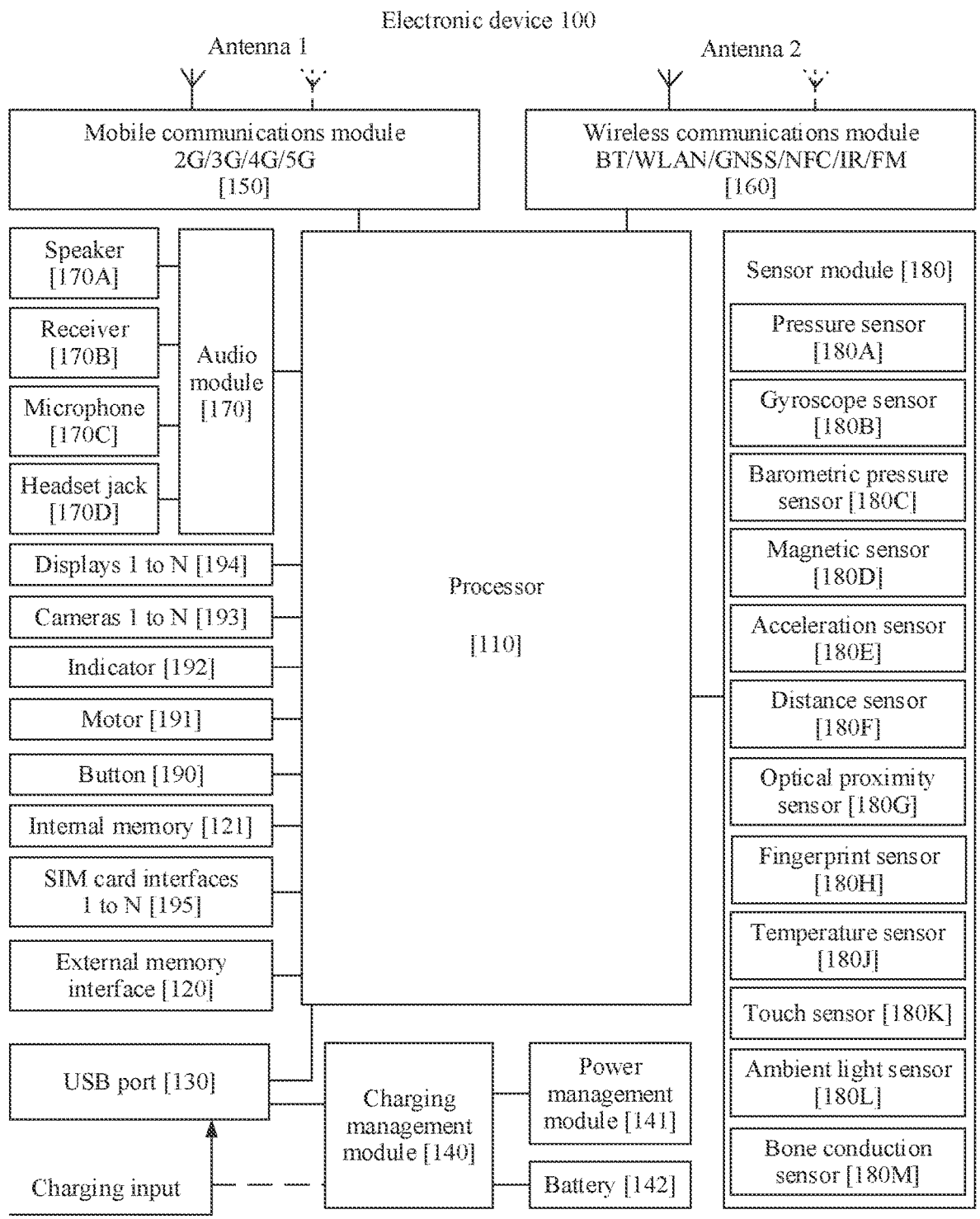
FIG. 2 is a schematic diagram of composition of a hardware structure of an electronic device according to an embodiment of this application.

FIG. 2 is a schematic diagram of a structure of an electronic device 100 according to an embodiment of this application. As shown in FIG. 2, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include mote or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a high-speed cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, end is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type C port, or the like. The USB port 130 may be configured to connect to a charger to charge the electronic device 100, may be configured to transmit data between the electronic device 100 and a peripheral device, or may be configured to connect to a headset to play audio by using the headset. Alternatively, the port may be used to connect to another electronic device, for example, an AR device.

It may be understood that an interface connection relationship between the modules illustrated in this embodiment of this application is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, battery cycles, a battery health status (electric leakage or impedance). In some other embodiments, the power management module 141 may alternatively be disposed in the processor 110. In some other embodiments, the power management module 141 and the charging management module 110 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna of a wireless local area network. In some other embodiments, an antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transfers the low-frequency baseband signal obtained through the demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like and that is applied to the electronic device 100. The wireless communications module 160 may be one or more devices that integrate at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The CPU is configured to perform mathematical and geometric calculation, and render an image. The processor 1110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a MicroOLed, a quantum dot light emitting diode (quantum dot light emitting diodes, QLED), or the like. In some embodiments, the electronic device 100 may include one or N displays 191, where N is a positive integer greater than 1.

In this embodiment of this application, the display 194 may be configured to display an interface of the electronic device. As shown in FIG. 1A to FIG. 1E, the display 194 may be configured to display a desktop of the electronic device and an interface of an application. The desktop of the electronic device includes icons of a plurality of applications. Both an icon of the application and the interface of the application may be displayed in the display 194.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto a photosensitive element. The photosensitive element may be a charge coupled device (charge coupled device, CCD) or a complementary metaloxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU may implement applications such as intelligent cognition of the electronic device 100, for example, image recognition, facial recognition, speech recognition, text comprehension, and the like.

In this embodiment of this application, the NPU may identify a first interface of a first application by using a picture recognition algorithm, and determine countdown duration of a countdown icon in the first interface of the first application.

The external memory interface 120 may be configured to connect to an external storage card (such as a Micro SD card), to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, in this embodiment of this application, the processor 110 may execute the instructions stored in the internal memory 121, and display corresponding display content on the display 184 in response to a tap operation or a selection operation performed by a user on the display 194. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, and may further include a non-volatile memory such as at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110. The speaker 170A, also referred to as a "horn", is configured to convert an electrical audio signal into a sound signal. The electronic device 100 may be used to listen to music or answer a call in a hands-free mode over the speaker 170A. The receiver 170B, also referred to as an "earpiece", is configured to convert an electrical audio signal into a sound signal. When a call is answered or audio information is listened to by using the electronic device 100, the receiver 170B may be put close to a human ear to listen to a voice. The microphone 170C, also referred to as a "mike" or a "microphone", is configured to convert a sound signal into an electrical signal. When making a call or sending voice information, the user may make a sound close to the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messaging icon, an instruction for viewing an SMS message is executed. When a touch operation whose touch operation intensity is greater than or equal to the first pressure threshold is performed on a Messaging icon, an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be used for image stabilization during photographing. For example, when a shutter is pressed, the gyroscope sensor 180B detects an angle at which the electronic device 100 shakes, obtains, through calculation based on the angle, a distance for which a lens module needs to compensate, and allows the lens to cancel the shake of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is applied to applications such as landscape/portrait mode switching and a pedometer.

The distance sensor 180F is configured to measure a distance. The electronic device 100 may measure a distance in a rusted manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, unlocking for application access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor may obtain vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) a also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may be further compatible with the external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

All methods in the following embodiments may be implemented on the electronic device 100 having the foregoing hardware structure.

A software system of the electronic device 100 may use a layered architecture, an event-driven architecture, a microkernel architecture, a micro service architecture, or a cloud architecture. In the embodiments of this application, an Android system with a layered architecture is used as an example to describe a software structure of the electronic device 100.

Figure 3:
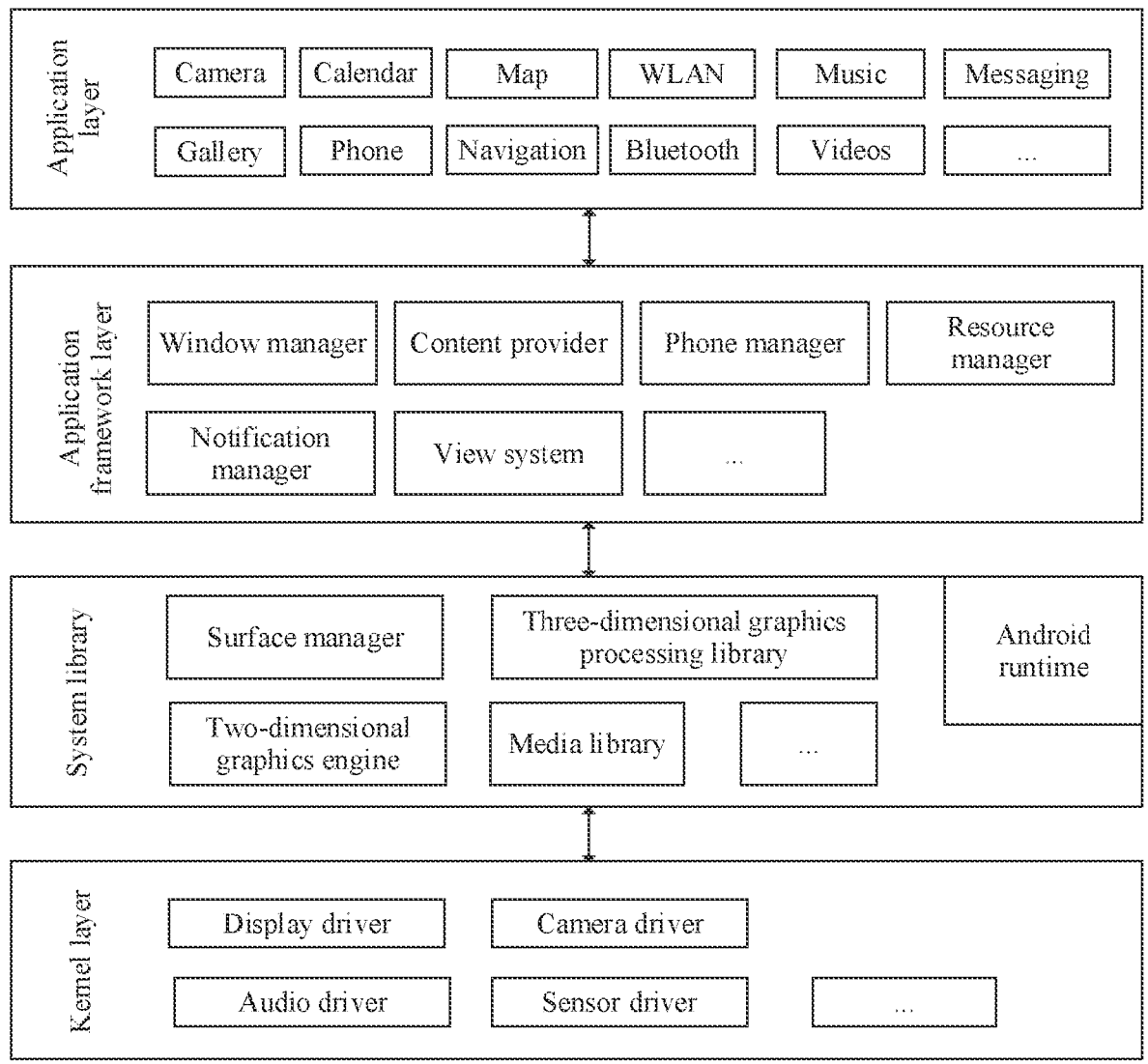
FIG. 3 is a schematic diagram of a software architecture of an electronic device according to an embodiment of this application.

FIG. 3 is a block diagram of a software structure of an electronic device 100 according to an embodiment of the present invention. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 3, the application package may include applications such as "camera", "gallery", "calendar", "phone", "map", "navigation", "WLAN", "Bluetooth", "music", "videos", and "messaging".

For example, the application package may include an application corresponding to the application icon in FIG. 1A, for example, "Email", "Settings", "AppGallery", "Photos", "WeChat", "Camera", "Books", "Vmall", "Videos", "Speaker", "Music", and "TikTok".

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system can be configured to construct an application. The display interface may include one or more views. For example, a display interface including an SMS message notification icon may include a view for text display and a view for picture display.

In this embodiment of this application, a data file describing an interface layout may be stored in a database. When constructing an interface (for example, a desktop including an application icon), the view system may obtain the stored data file by using the content provider, and display the interface based on the obtained data file. In some embodiments, when the interface is constructed, the data file stored in the content provider may be further modified.

The phone manager is configured to provide a communication function of the electronic device 100, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a core library and a virtual machine. The Android runtime is responsible for scheduling and management of the Android system.

The core library includes two parts: a function that needs to be invoked in java language and a core library of Android.

The application layer and the application framework layer nut on the virtual machine. The virtual machine executes java files at the application layer and the application framework layer as binary files. The virtual machine is configured to perform functions such as object lifecycle management, stack management, thread management, security told exception management, and garbage collection.

The system library may include a plurality of functional modules, for example, a surface manager (surface manager), a media library (Media library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and video in a plurality of commonly used formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image drawing, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 4:
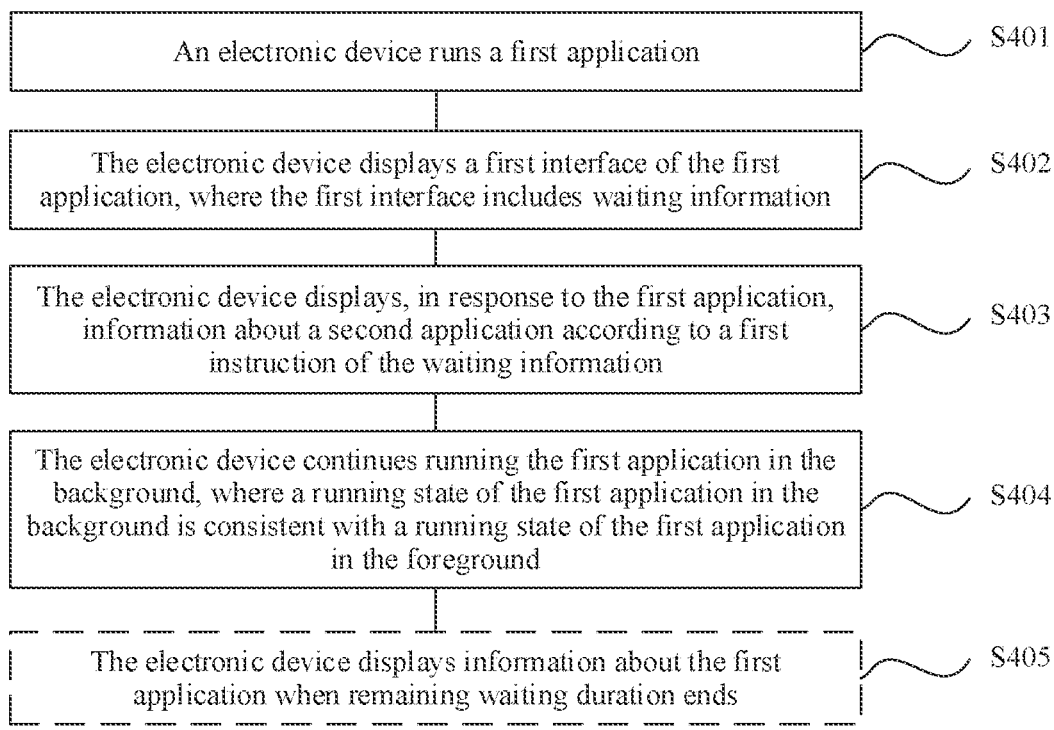
FIG. 4 is a flowchart 1 of a processing method for a waiting scenario in an application according to an embodiment of this application.

The following specifically describes the technical solutions provided in the embodiments of this application by using an example in which the electronic device is a mobile phone, and the waiting scenario is a game matching scenario in a game application. As shown in FIG. 4, the processing method for a waiting scenario in an application may include steps S401 to S405.

S401: An electronic device runs a first application.

For example, the first application is an application in the electronic device. For example, the first application may be an application in a whitelist, the whitelist may include one or more applications, and the one or more applications in the whitelist may be set by a user, or may be factory configured. This is not limited in this embodiment of this application.

For example, that the electronic device runs the first application in step S401 means that the electronic device runs the first application in the foreground. When the first application is run in the foreground, the electronic device displays an interface of the first application.

S402: The electronic device displays a first interface of the first application, where the first interface includes waiting information.

For example, the electronic device can continue running only after the waiting duration ends in the first interface including the waiting information. It may be understood that the first interface including the waiting information may be considered as a current scenario of the first application as a waiting scenario, and the first application needs to wait for preset duration before continuing being running.

For example, the waiting information may include a countdown icon, waiting duration text information, pause information, or the like. A specific form of the waiting information is not limited in this embodiment of this application, and is merely an example for description herein. In the following embodiment, only the wait information is the countdown icon for description. Optionally, the countdown icon may include remaining waiting duration. For example, the first interface including the waiting information may be referred to as a waiting interface.

Figure 5A:
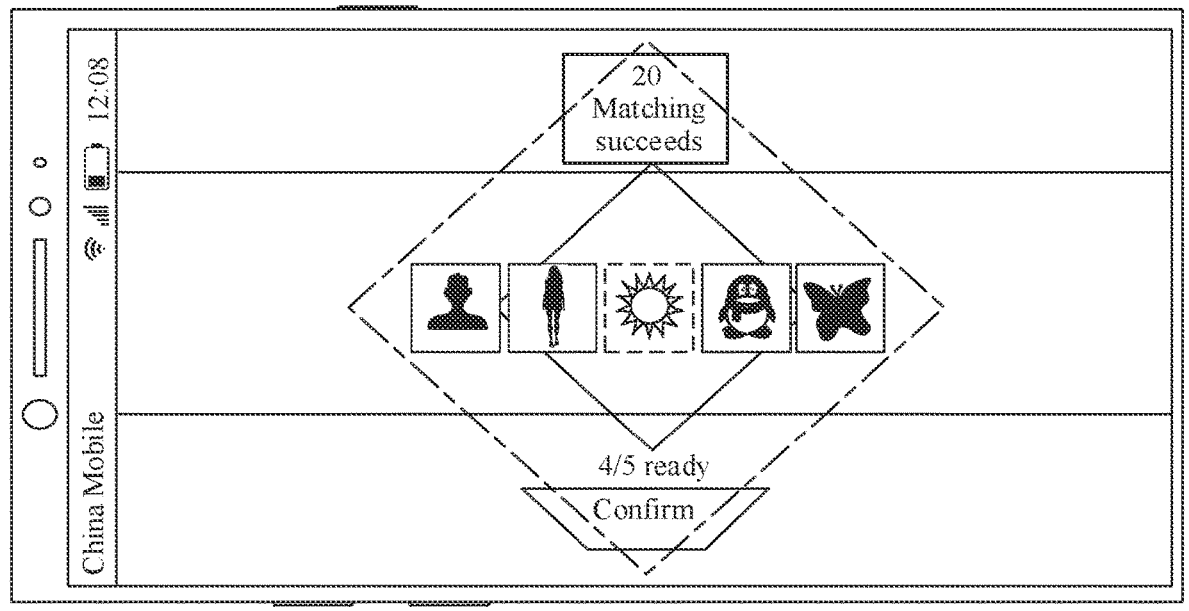
FIG. 5A is a schematic diagram 1 of an example of a display interface of an electronic device according to an embodiment of this application.

For example, as shown in FIG. 5A, the first interface of the first application is a game matching interface in a game application. The first interface of the first application includes the countdown icon, and the countdown icon includes remaining waiting duration 20 seconds. After the remaining waiting duration ends, the electronic device displays a game start interface shown in FIG. 5B.

S403: The electronic device displays, in response to the first application, information about a second application according to a first instruction of the waiting information.

For example, when the first interface of the first application includes the countdown icon, that is, when the first interface of the first application is the waiting interface, a software development kit (Software Development Kit, SDK) of the first application may transmit the first instruction to the electronic device through an application interface (Application Interface, API). The first instruction is used to indicate that the first interface of the first application is the waiting interface. In other words, in this embodiment of this application, the API interface may be provided for the first application. The first application invokes the API interface when waiting time of the waiting scenario starts, and actively notifies, by using the first instruction, the electronic device that waiting of the first application starts. The electronic device displays the information about the second application in response to the first instruction.

Operationally, the first instruction of the waiting information may include remaining waiting duration.

In an implementation, the information about the second application refers to a second interface of the second application. In this implementation, in response to the SDK of the first application, the electronic device displays the second interface of the second application according to the first instruction of the waiting information. In other words, when the first interface of the first application is the waiting interface, the electronic device directly switches the first application to the second application, and displays the second interface of the second application.

For example, as shown in FIG. 5A, the first interface displayed by the electronic device is the game matching interface in the game application, and the first interface includes the countdown icon. In response to the SDK of the first application, the electronic device may switch the first interface in FIG. 5A to the interface of the second application in FIG. 5E according to the first instruction of the waiting information. In other words, when the first application is the waiting scenario, the electronic device may directly switch the first application to run in the background, and run the second application in the foreground.

In another implementation, the information about the second application refers to an icon of the second application. For example, the electronic device displays the icon of the second application in response to the first instruction. The icon of the second application may be displayed in a form of prompt information. For example, the electronic device may display first prompt information, where the first prompt information includes the icon of the second application. The first prompt information is used to prompt the user of an application that can be selected. Optionally, the first prompt information may include an icon of at least one application, and the icon of the at least one application includes the icon of the second application.

For example, as shown in FIG. 5A, when the waiting time of the first interface of the first application starts, the SDK of the first application transmits the first instruction to the electronic device through the API interface. As shown in FIG. 5C, the electronic device displays the first prompt information in response to the first instruction, where the first prompt information includes the icon of the at least one application. In other words, in this embodiment of this application, when the countdown starts for the first application, the electronic device may display the first prompt information, to prompt the user to select an application that can be switched to run in the foreground.

For example, the at least one application may include one or more applications that are run in the background of the electronic device. Alternatively, the at least one application is one or more applications whose quantity of running times or running duration within preset time is greater than a preset threshold. Alternatively, the at least one application is one or more applications preconfigured in the electronic device. A specific form of the at least one application is not limited in this embodiment of this application.

For example, the electronic device may display the first prompt information in the first interface of the first application by using a pop-up box. For example, applications that are run in the background of the electronic device include "WeChat", "TikTok", "Taobao", and "Weibo". As shown in FIG. 5C, when the first interface of the first application is the waiting interface, in response to the SDK, the electronic device displays, according to the first instruction of the waiting information, the first prompt information in the first interface of the first application by using a pop-up box, where the first prompt information includes a "WeChat" icon, a "TikTok" icon, a "Taobao" icon, and a "Weibo" icon. The "WeChat" icon is the icon of the second application.

It may be understood that, in this embodiment, the first application may learn that the current interface of the first application is the waiting interface, and does not need to identify in real time whether the first interface of the first application is the waiting interface. Therefore, compared with the conventional technology in real time identifying whether video content is an advertisement, in this embodiment of this application, the SDK learns that the current interface of the first application is the waiting interface. In this way, system overheads are small, and running efficiency and system performance are improved.

Optionally, when the information about the second application refers to the icon of the second application, after step S403, the method may further include: The electronic device receives a selection operation performed by the user on the icon of the second application; and the electronic device displays the second interface of the second application in response to the selection operation of the user.

For example, the user may select any application from the at least one application included in the first prompt information, the application selected by the user is the second application, and the electronic device receives a tap operation performed by the user on the second application.

For example, the user may select, based on a service that the user is interested in or a service that needs to be processed in time, from the at least one application included in the first prompt information. For another example, the user may select a "WeChat" application. As shown in FIG. 5D, the user taps the "WeChat" icon, and the electronic device receives the tap operation performed by the user on the "WeChat" icon. As shown in FIG. 5E, the electronic device displays a "WeChat" interface in response to the selection operation of the user.

S404: The electronic device continues running the first application in the background. A running state of the first application in the background is consistent with a running state of the first application in the foreground.

For example, when the electronic device runs the first application in the background, the running state of the first application in the background is consistent with the running state of the first application in the foreground. That the running state of the first application in the background is consistent with the naming state of the first application in the foreground means that when the first application is run in the background, the remaining waiting duration of the first application is not suspended, but the remaining waiting duration may continue counting down in the background like the running state of the first application in the foreground. For example, when the remaining waiting duration in the countdown icon of the first application is 20 seconds, the electronic device runs the second application in the foreground, and the first application is switched to the background for running. When the electronic device switches the first application to the foreground again for running after running the second application in the foreground for 10 seconds, the remaining waiting duration in the countdown icon of the first application is 10 seconds. In other words, when the first application is run in the background, the remaining waiting duration in the countdown icon of the first application does not stop, but may continue counting down in the background.

It should be noted that, a life cycle of an activity in an Android system may include: (1) When the activity is started, the system first invokes an onCreate method, then invokes an onStart method, and finally invokes an onResume method, and the activity enters a running state. (2) When the current activity is overwritten by another activity or a screen is locked, the system invokes an onPause method to pause execution of the current activity. (3) When the current activity returns to the foreground from the overwritten state or the screen is unlocked, the system invokes the onResume method to enter the running state again. (4) When the current activity switches to a new activity interface or presses a home button to return to a home screen, and the current activity is in the background, the system invokes the onPause method and then invokes an onStop method to enter a suspended state. (5) When the user returns to the activity, the system invokes an onRestart method, then invokes the onStart method, and finally invokes the onResume method to enter the running state again. (6) The current activity is in the overwritten state or is invisible in the background, that is, (2) and (4). System memory is insufficient and the current activity is killed. When the user returns to the current activity, the onCreate method, onStart method, and onResume method are invoked again to enter the running state. (7) When the user exits the current activity, the system invokes the onPause method, then invokes the onStop method, and finally invokes an onDestory method to end the current activity.

With reference to the life cycle of the activity in the Android system, it can be learned that when the electronic device runs the first application in the foreground, if the user selects the second application, after receiving the selection operation of the user, the electronic device switches the second application to the foreground for running, and switches the first application to the background for running, which corresponds to (4) in the life cycle. The system invokes an onPause( ) interface. After the system invokes the onPause( ) interface, the first application is suspended. In other words, when the electronic device runs the second application in the foreground, the first application is suspended in the background. It may be understood that, when the first application is suspended in the background, the remaining waiting duration in the countdown icon of the first application is also suspended, and the countdown does not continue in the background.

To improve utilization of the waiting tune of the first application, in this embodiment of this application, the following two manners may be used to ensure that the running state of the first application in the background is consistent with the running state of first application in the foreground. In other words, when the first application is run in the background, the remaining waiting duration of the first application may continue counting down in a same way that the first application is run in the foreground.

In an implementation, when the first application is run in the background, the electronic device intercepts a pause (PAUSE) command transmitted to the first application, so that the running state of the first application in the background is consistent with the running state of the first application in the foreground.

In the conventional technology, when the first application in the background, the system transmits the PAUSE command to the first application through the onPause( ) interface, the first application is suspended running in the background, and the countdown of the remaining waiting duration of the first application is also suspended. In other words, in the conventional technology, the running state of the first application in the background is inconsistent with the running state of the first application in the foreground. However, in this embodiment of this application, when the first application is run in the background, the electronic device intercepts the PAUSE command transmitted to the first application. For example, the electronic device does not invoke the onPause( ) interface. To be specific, when the first application is run in the background, the system does not invoke the onPause( ) interface, and the first application does not receive the PAUSE command sent by the system. Therefore, the first application may continue running in the background, the remaining waiting duration of the first application is not suspended, and the countdown may be continued in the background. In other words, in this embodiment of this application, the running state of the first application in the background is consistent with the running state of the first application in the foreground.

For example, with reference to FIG. 5D and FIG. 5E, after the user selects and taps the "WeChat" icon, in response to the selection operation of the user, the electronic device displays the second interface of the second application selected by the user, that is, a "WeChat" interface shown in FIG. 5E. In response to the selection operation performed by the user on the second application, the electronic device runs the second application in the foreground, and runs the first application in the background, and the electronic device may intercept the pause (PAUSE) command transmitted to the first application. In other words, when the first application is run in the background, the first application does not receive the PAUSE command sent by the system. For another example, as shown in FIG. 5E, when the electronic device switches the first application to the foreground again after running "WeChat" for 10 seconds, the remaining waiting duration in the countdown con of the first application is 10 seconds. Therefore, for the first application, when the first application is run in the background, the remaining waiting duration of the first application may continue counting down in the background.

In another implementation, when the first application is run m the background, the electronic device transmits a second instruction to the first application, where the second instruction is used to instruct the first application to continue running based on the running state in the foreground.

For example, when the first application is run in the background, the electronic device may invoke the onPause( ) interface, and transmit the second instruction through the onPause( ) interface, to instruct the first application to continue running based on the running state in the foreground. For example, when the first application is run in the background, the electronic device may invoke the onPause( ) interface, and transmit the second instruction through the onPause( ) interface. In this case, the first application may continue running in the background based on the running state in the foreground. For example, the remaining waiting duration of the first application may continue counting down in the background based on the running state in the foreground. In this implementation, when transmitting a continuing running instruction through the onPause( ) interface, the electronic device needs to modify a running logic of the first application.

For example, the second interface of the second application may further include waiting information. As shown in FIG. 5F, for example, the waiting information is the countdown icon. The electronic device displays the second interface of the second application, where the second interface includes the countdown icon, and the countdown icon is "countdown: 19 seconds". As shown to FIG. 5G, before the countdown ends, the electronic device may always display the countdown icon. As time elapses, countdown duration in the countdown icon decreases by second, and the countdown icon in FIG. 5G is "countdown: 17 seconds".

It should be noted that the second interface is an interface of the second application, and the second interface may change in a process in which the user operates the second application. For example, an interface displayed by the electronic device in FIG. 5F and an interface displayed by the electronic device in FIG. 5G are different interfaces, but the different interfaces are interfaces of the second application. Therefore, both the interface displayed by the electronic device in 5F and the interface displayed by the electronic device in FIG. 5G may be considered as the second interface of the second application. It may be understood that an interface of the second application in this embodiment of this application may be referred to as the second interface of the second application.

It may be understood that in this embodiment, when the first interface of the first application is the waiting interface, the SDK of the first application transmits the first instruction, and the electronic device may display the second interface of the second application or the icon of the second application in response to the first instruction of the SDK, and continue running the first application in the background. In other words, in this embodiment of this application, the first application may be directly switched to the second application, or the first prompt information may be displayed by using a pop-up box, and the first interface of the first application may be switched to the second interface of the second application after an operation of the user is received, without first switching from the first interface of the first application to a main interface, and then switching from the main interface to the second interface of the second application as in the conventional technology. Therefore, compared with the conventional technology, the switch method provided in this embodiment of this application has a small quantity of switching times, and user experience is better. In addition, obtaining the waiting scenario by using the first application has small system overheads compared with real-time monitoring the first application. In addition, in this embodiment of this application, the running state of the first application in the background is consistent with the running state of the first application in the foreground, and the remaining waiting duration of the first application is not suspended. Therefore, while running the second application in the foreground, the first application may continue running in the background, to fully utilize the waiting time of the first application.

Optionally, when the first application continues running in the background, the electronic device does not kill a process corresponding to the first application. In other words, a process of the first application may be kept alive in the background without being killed by the system. Optionally, the system may not kill the process corresponding to the first application within preset time. If running time of the first application in the background exceeds the preset time and the system memory is insufficient, the system may kill the process of the first application. For example, when the waiting time of the first application is 20 seconds, when the electronic device runs the second application in the foreground, and when the running time of the first application in the background does not exceed 10 minutes, the system does not kill the process of the first application. If the first application is run in the background for more than 10 minutes, the process of the first application may be killed when the system memory is insufficient.

Optionally, when the electronic device runs the second application in the foreground, and runs the first application in the background, the electronic device may play audio of the first application. For example, when the audio of the first application conflicts with audio of the second application, the electronic device may close the audio of the first application, and play the audio of the second application. For example, when the electronic device runs "WeChat" in the foreground, and runs "Arena of Valor" in the background, if the user taps voice information sent by a WeChat friend or plays a video or audio in the WeChat application, it may be considered that audio of "WeChat" conflicts with that of "Arena of Valor". The electronic device closes the audio of "Arena of Valor" and plays the audio of "WeChat". If the audio of "WeChat" and "Arena of Valor" do not conflict when the user sends a text in "WeChat", the electronic device may play the audio of "Arena of Valor".

Optionally, when the electronic device runs the second application in the foreground, and runs the first application in the background, regardless of whether the audio of the first application conflicts with the audio of the second application, the electronic device may keep disabling the audio of the first application until the electronic device runs the first application in the foreground, and then playing the audio of the first application. For example, when the electronic device runs "WeChat" in the foreground, and runs "Arena of Valor" in the background, if the user taps voice information sent by a WeChat friend or plays a video or audio in the WeChat application, the electronic device plays the audio of "WeChat". If the user sends a text in WeChat, the electronic device does not play audio. When the electronic device runs "Arena of Valor" again in the foreground, the electronic device plays the audio of "Arena of Valor". In other words, the electronic device plays only audio of an application that is run in the foreground.

Optionally, after steps S401 to S404, the method may further include S405.

S405: The electronic device displays information about the first application when the remaining waiting duration ends.

For example, that the remaining waiting duration ends may mean that the remaining waiting duration of the first application counts down from 20 seconds to 0 seconds, or may mean that all players in a game matching scenario join the game. This is not limited in this embodiment of this application.

In an implementation, the information about the first application refers to a display interface of the first application after the remaining waiting duration of the first interface ends. In this implementation, after the remaining waiting duration of the first application ends, the electronic device displays the display interface of the first application after the remaining waiting duration of the first application ends, and the second application is switched to the background for running.

Figure 5B:
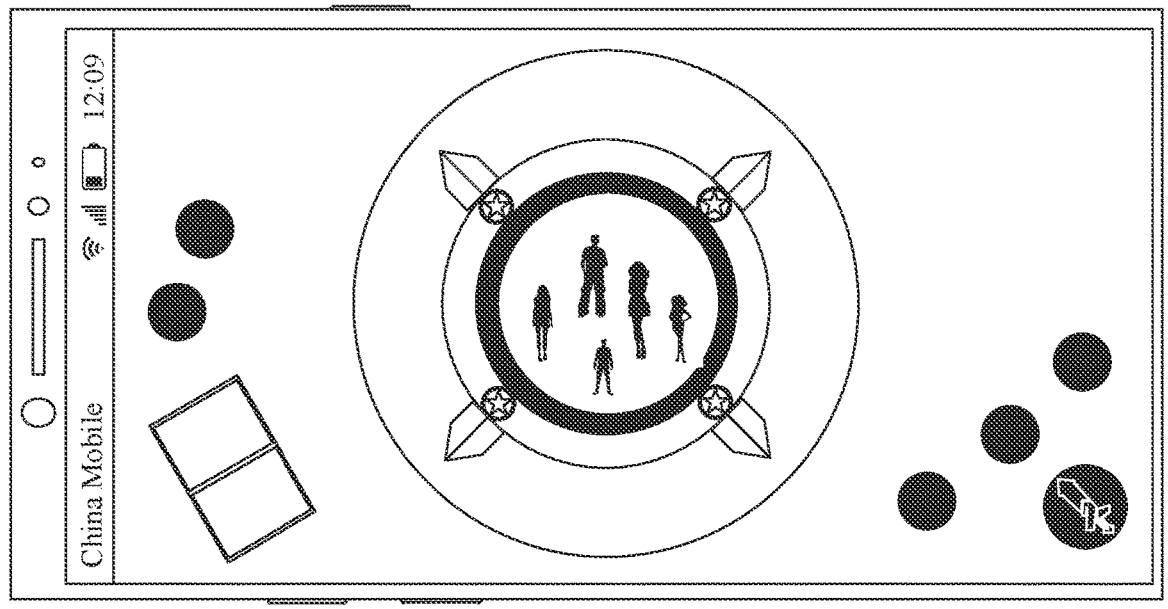
FIG. 5B is a schematic diagram 2 of an example of a display interface of an electronic device according to an embodiment of this application.
Figure 5C:
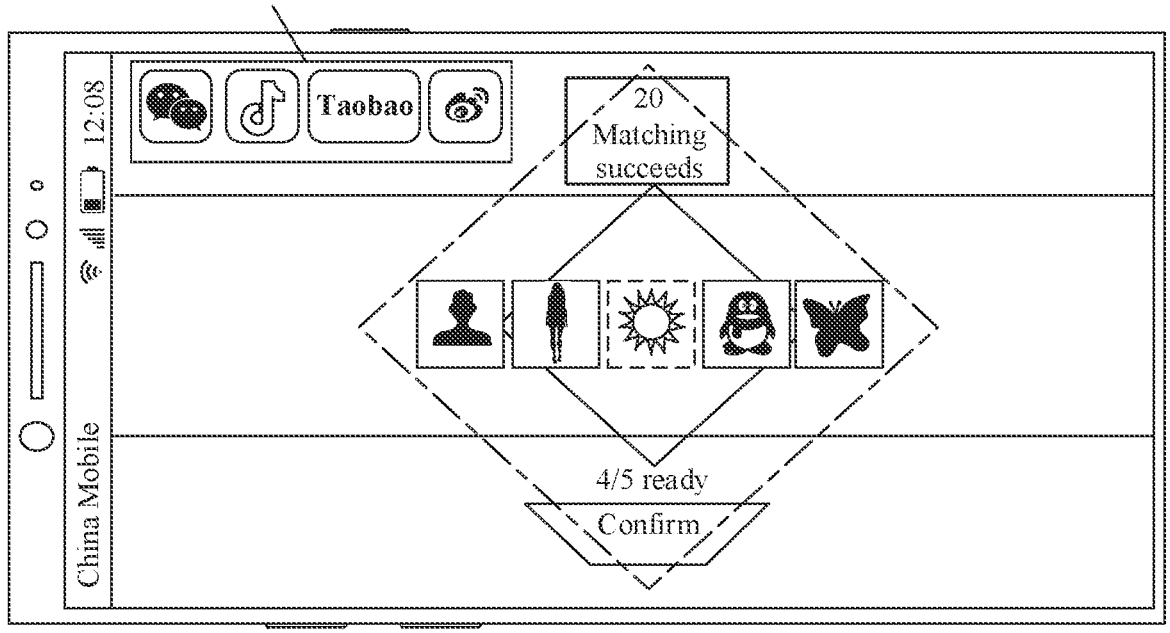
FIG. 5C is a schematic diagram 3 of an example of a display interface of an electronic device according to an embodiment of this application.
Figure 5D:
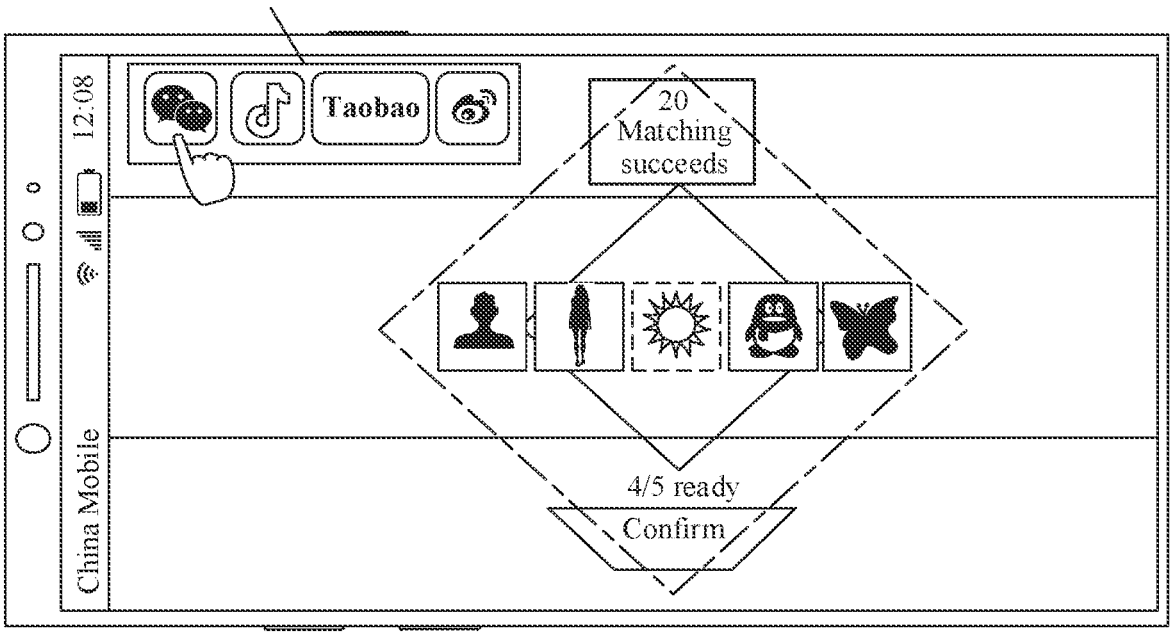
FIG. 5D is a schematic diagram 4 of an example of a display interface of an electronic device according to an embodiment of this application.
Figure 5E:
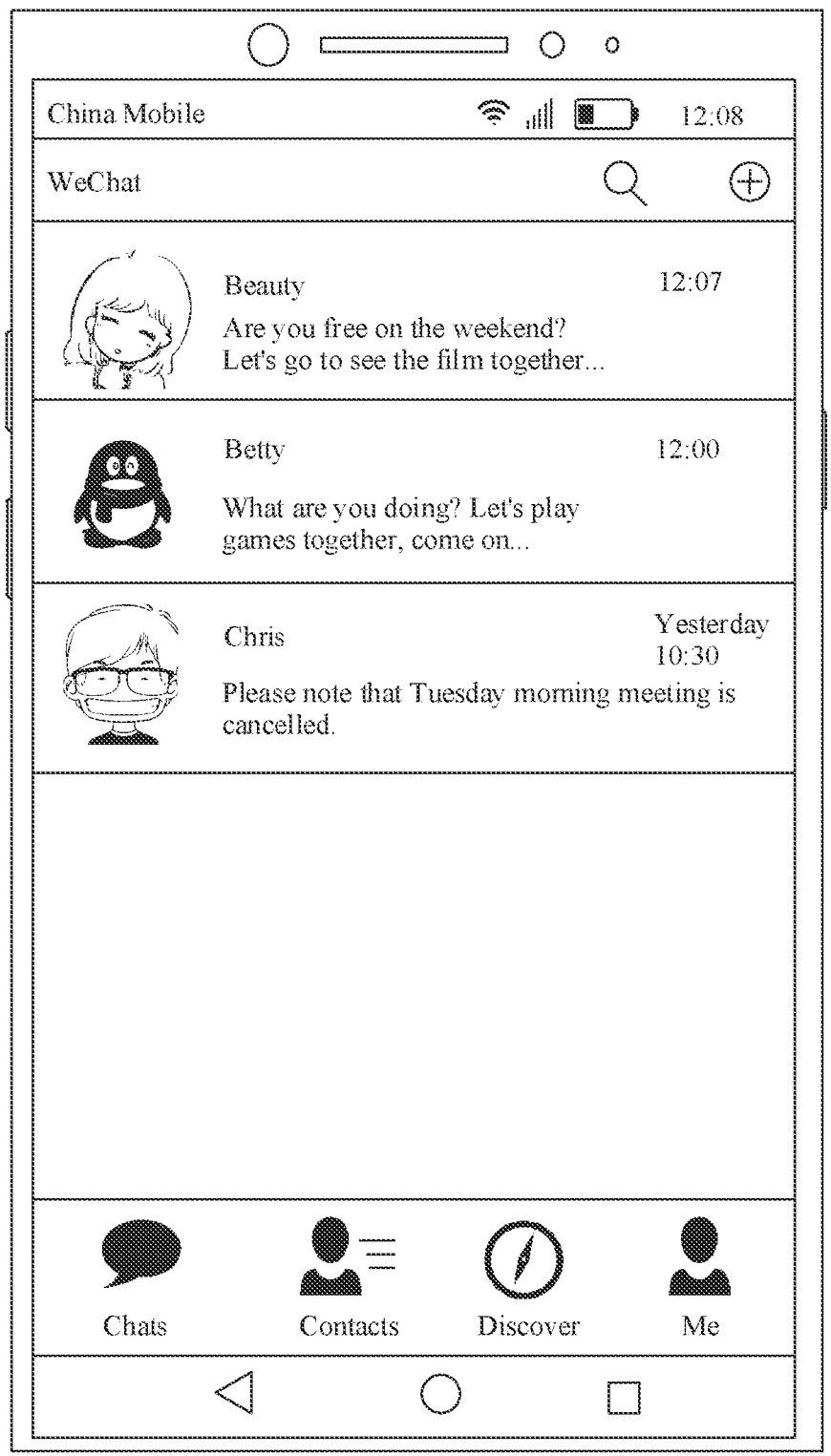
FIG. 5E is a schematic diagram 5 of an example of a display interface of an electronic device according to an embodiment of this application.
Figure 5F:
FIG. 5F is a schematic diagram 6 of an example of a display interface of an electronic device according to an embodiment of this application.
Figure 5G:
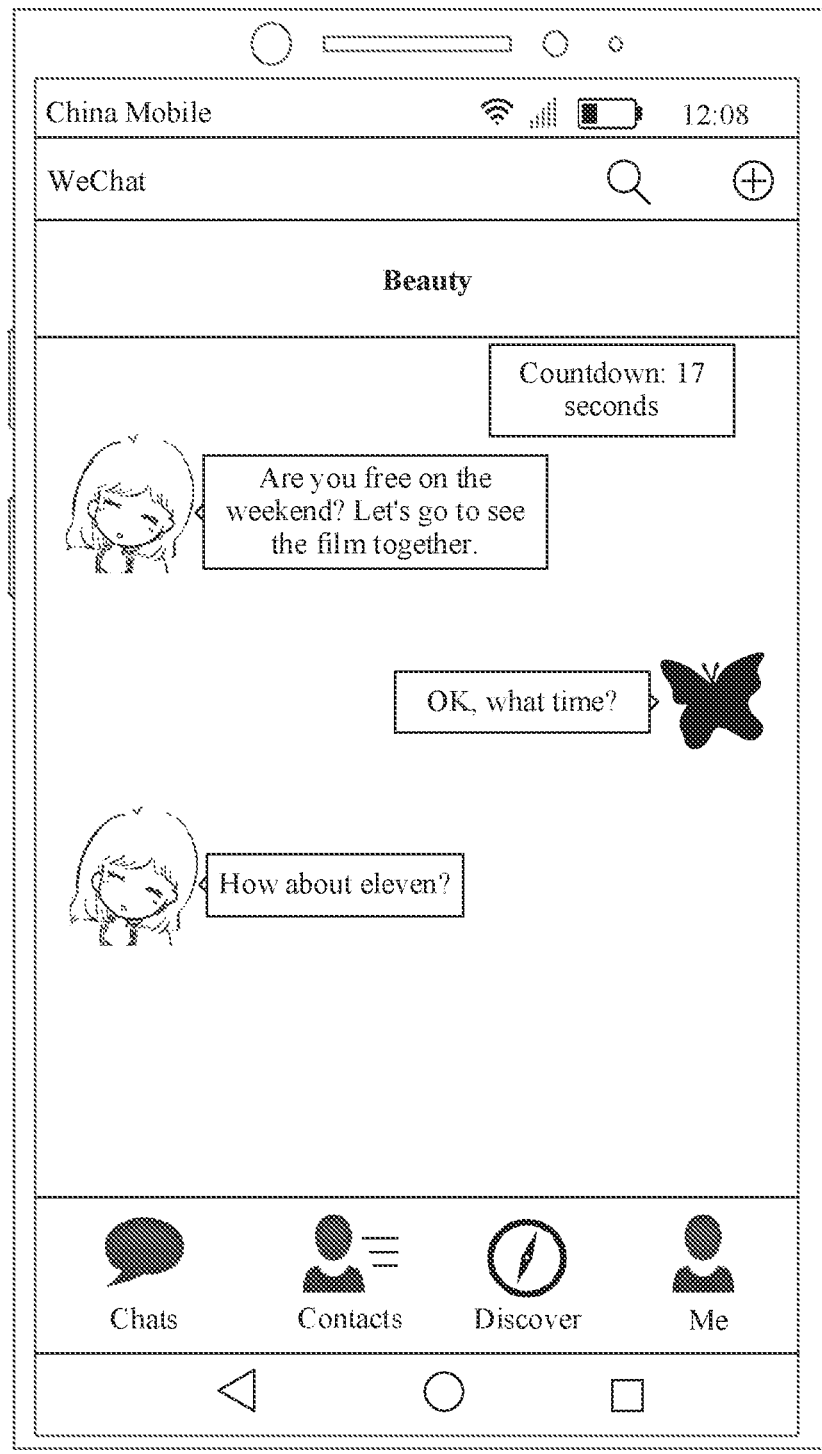
FIG. 5G is a schematic diagram 7 of an example of a display interface of an electronic device according to an embodiment of this application.

For example, as shown in FIG. 5G, when the remaining waiting duration is 0, that is, when the remaining waiting duration of the electronic device ends, the electronic device displays an interface in FIG. 5B. The interface in FIG. 5B is a display interface of the first application after the remaining waiting duration in FIG. 5A ends. In this implementation, when the remaining waiting duration ends, the electronic device may directly switch the first application to the foreground for running.

Figure 5H:
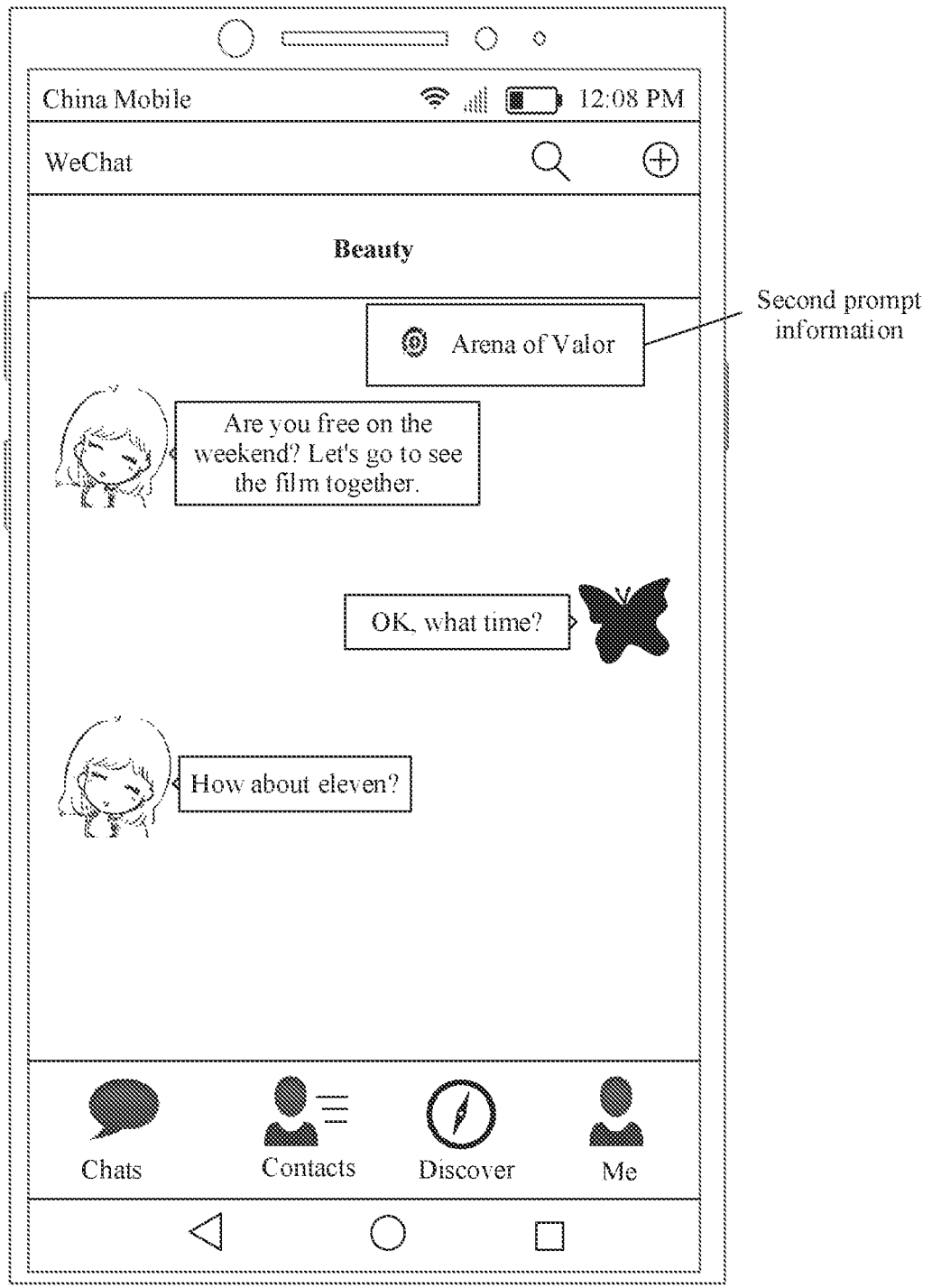
FIG. 5H is a schematic diagram 8 of an example of a display interface of an electronic device according to an embodiment of this application.

In another implementation, the information about the first application refers to an icon of the first application. For example, when the remaining waiting duration ends, the electronic device displays the icon of the first application in the second interface of the second application. The icon of the first application may be displayed in a form of prompt information. For example, the electronic device may display second prompt information, where the second prompt information includes the icon of the first application. For example, as shown in FIG. 5H, for example, the first application is "Arena of Valor", and the second prompt information includes an icon of "Arena of Valor".

For example, the electronic device may display the second prompt information in the second interface of the second application by using a pop-up box. The second prompt information may be displayed in a form of a float ball, a floating window, or the like in the foreground of the electronic device. A specific display form and display content of the second prompt information are not limited in this embodiment of this application, and are merely example descriptions herein.

In this implementation after step S405, the method may further include: The electronic device receives a tap operation performed by the user on the icon of the first application; and the electronic device displays a third interface of the first application in response to the tap operation performed by the user on the icon of the first application.

For example, in a process in which the user uses WeChat, the electronic device displays the second prompt information, and the user learns that the countdown of the first application ends. If the user wants to return to the first application, the user may tap the icon of the first application in the second prompt information, and the electronic device receives the tap operation performed by the user on the icon of the first application.

Figure 5I:
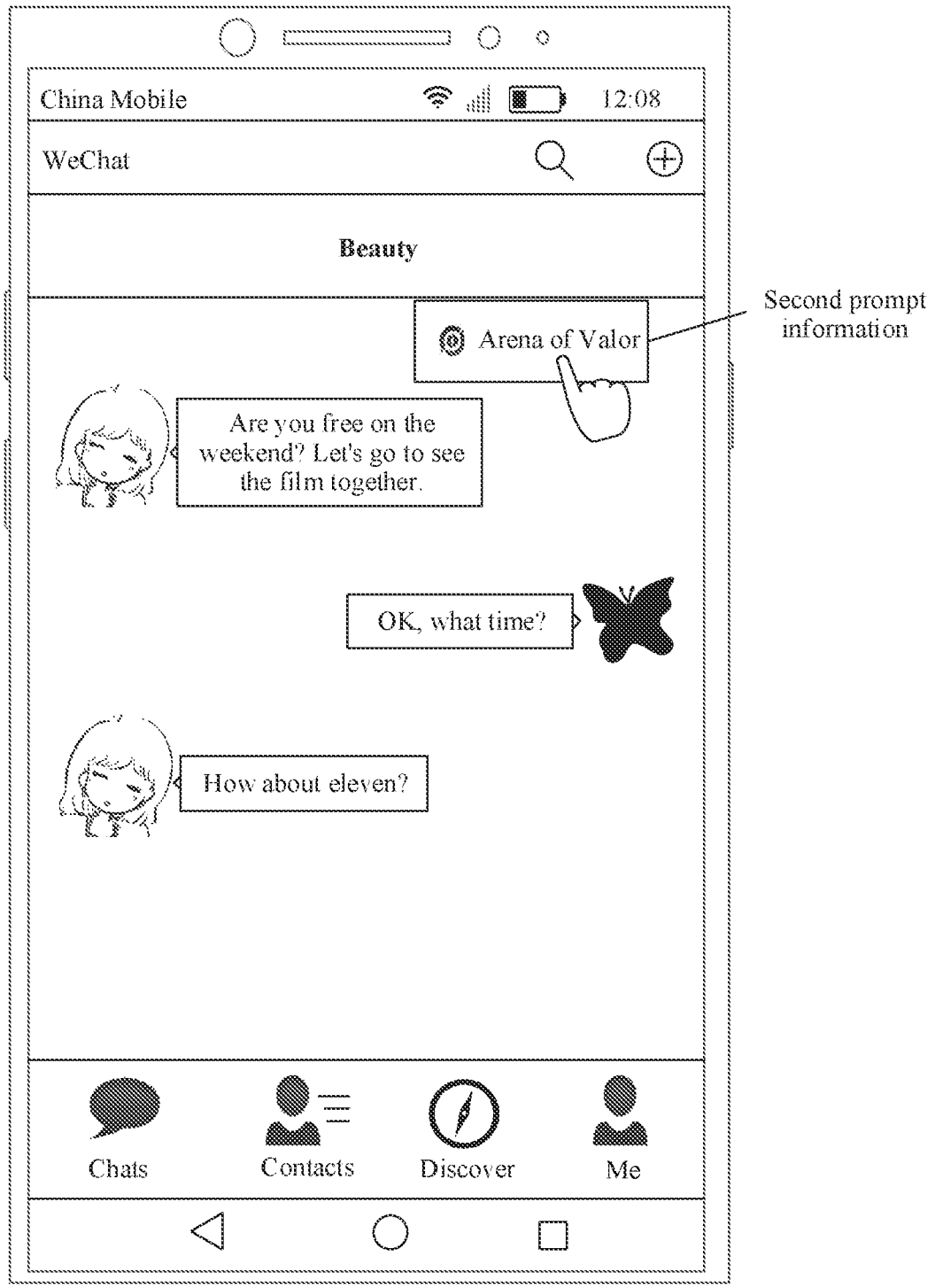
FIG. 5I is a schematic diagram 9 of an example of a display interface of an electronic device according to an embodiment of this application.

For example, as shown in FIG. 5I, when the countdown ends, if the user wants to switch to the first application to continue playing the game, the user taps the icon of "Arena of Valor" in the second prompt information, and the electronic device receives the tap operation performed by the user on the icon of "Arena of Valor".

For example, in response to the tap operation performed by the user on the icon of the first application, the electronic device may display a display interface of "Arena of Valor" after the remaining countdown duration of "Arena of Valor" ends. For example, the interface shown in FIG. 5B.

Optionally, after the electronic device displays the second prompt information in the second interface of the second application, if the user does not tap the icon of the first application in the second prompt information within first preset duration, the electronic device may close the second prompt information, and prompt the second prompt information again by using a pop-up box after second preset duration. If the user does not tap the icon of the first application in the second prompt information within third preset duration, the electronic device may close the first application.

It may be understood that, in this embodiment, when the first interface of the first application includes the waiting information, it may be learned, by using the first application, that a current interface of the electronic device is a waiting interface, and the electronic device displays the information about the second application. In this case, the first application is switched to the background for running. In addition, the running state of the first application in the background is consistent with the running state of the first application in the foreground, and after remaining waiting duration ends, the electronic device displays the information about the first application. In other words, when the electronic device runs the second application in the foreground, the running state of the first application in the background is consistent with the running state of the first application in the foreground. For example, the countdown of the first application may continue running in the background. After the countdown of the first application ends, the electronic device switches the first application back to the foreground again for running. In this case, the electronic device displays the display interface of the first application after the remaining countdown of the first application ends. It may be understood that, in the method in this embodiment of this application, the waiting time of the first application can be fully utilized, thereby improving user time utilization.

For example, when the remaining waiting duration ends means that the countdown of the first application counts down from preset duration to 0 seconds, before step S405, the method further includes: The electronic device determines the remaining waiting duration.

Optionally, the first instruction may carry the countdown duration. The electronic device may determine the remaining waiting duration by using the first instruction, and when the remaining waiting duration ends, the electronic device displays the information about the first application.

Optionally, when the first instruction does not carry the remaining waiting duration, the electronic device may determine the remaining waiting duration by identifying the waiting information in the first interface of the first application. For example, the electronic device may capture the first interface of the first application, and identify the remaining waiting duration in the countdown icon in the first interface of the first application by using a picture recognition algorithm. For another example, the electronic device may determine the remaining waiting duration by using a control of the countdown icon. A specific manner in which the electronic device determines the remaining waiting duration is not limited in this embodiment of this application, and is merely an example for description herein.

This embodiment of this application provides the processing method for a waiting scenario in an application. In the method, the electronic device runs the first application; the electronic device displays the first interface of the first application, where the first interface includes the waiting information; the electronic device displays, in response to the first application, the information about the second application according to the first instruction of the waiting information; and the electronic device continues running the first application in the background, where the state in which the first application is not suspended when running in the background is consistent with the naming state of the first application in the foreground. In this embodiment, waiting start time of the first application is learned by using the first application. Compared with the conventional technology in which the waiting start lime is learned by monitoring the first application in real time, in this solution, system overheads are small, and system performance is improved. In addition, when waiting starts, the information about the second application may be displayed according to the first instruction of the waiting information. In other words, the electronic device may directly switch from the interface of the first application to the interface of the second application, without first switching the interface of the first application to the main interface and switching the main interface to the interface of the second application as in the conventional technology. Therefore, a quantity of interface switching times is small, a user operation is convenient, and user experience is improved. In addition, in this embodiment, when the electronic device runs the first application in the background, the running state of the first application is consistent with the running state of the first application in the foreground. When the first application is run in the background, the remaining waiting duration of the first application is not suspended. Therefore, when the second application is run in the foreground, the remaining waiting duration of the first application may continue performing in the background. Therefore, the waiting duration of the first application can be effectively used, and time utilization of the user is improved.

Figure 6:
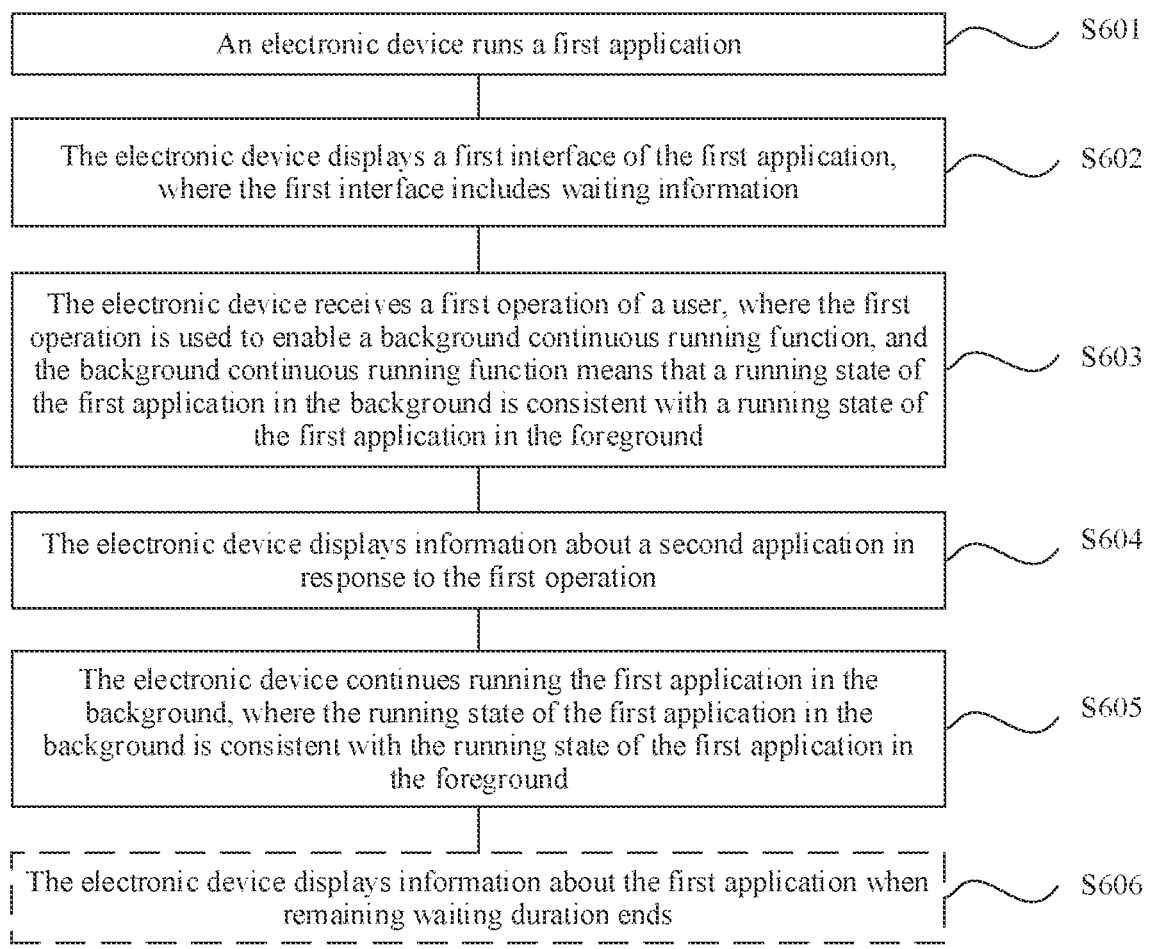
FIG. 6 is a flowchart 2 of a processing method for a waiting scenario in an application according to an embodiment of this application.

An embodiment of this application further provides a processing method for a waiting scenario in an application. As shown in FIG. 6, the method may include steps S601 to S606.

S601: An electronic device runs a first application.

S602: The electronic deice displays a first interface of the first application, where the first interface includes waiting information.

It may be understood that for specific implementations of steps S601 and S602, refer to related descriptions of steps S401 and S402. Details are not described herein again.

S603: The electronic device receives a first operation of a user, where the first operation is used to enable a function of continuing running in the background, and the function of continuing running in the background means that a running state of the first application in the background is consistent with a running state of the first application in the foreground.

For example, the first operation may be a gesture operation, or may be a tap operation. When the first operation is the gesture operation, the gesture operation does not conflict with an existing gesture operation in the first application. A specific form of the first operation is not limited in this embodiment of this application. For example, when the first operation is the tap operation, the electronic device displays an interface of the first application. The interface of the first application may have a float ball, and the float ball is used to enable the function of continuing running in the background. When the user taps the float ball, after receiving the tap operation of the user on the float ball, the electronic device may enable the function of continuing running in the background. For another example, when the first operation is the gesture operation, the gesture operation may be drawing a circle, drawing an S, or drawing a gesture such as "✓" in the interface of the first application. When the user draws the circle in the first interface of the first application, the electronic device receives a touch operation performed by the user on the first application.

For example, that the running state of the first application in the background is consistent with the running state of the first application in the foreground means that when the first application is run in the background, remaining waiting duration of the first application is not suspended, but the remaining waiting duration may continue counting down in the background like the running state of the first application in the foreground.

Figure 7A:
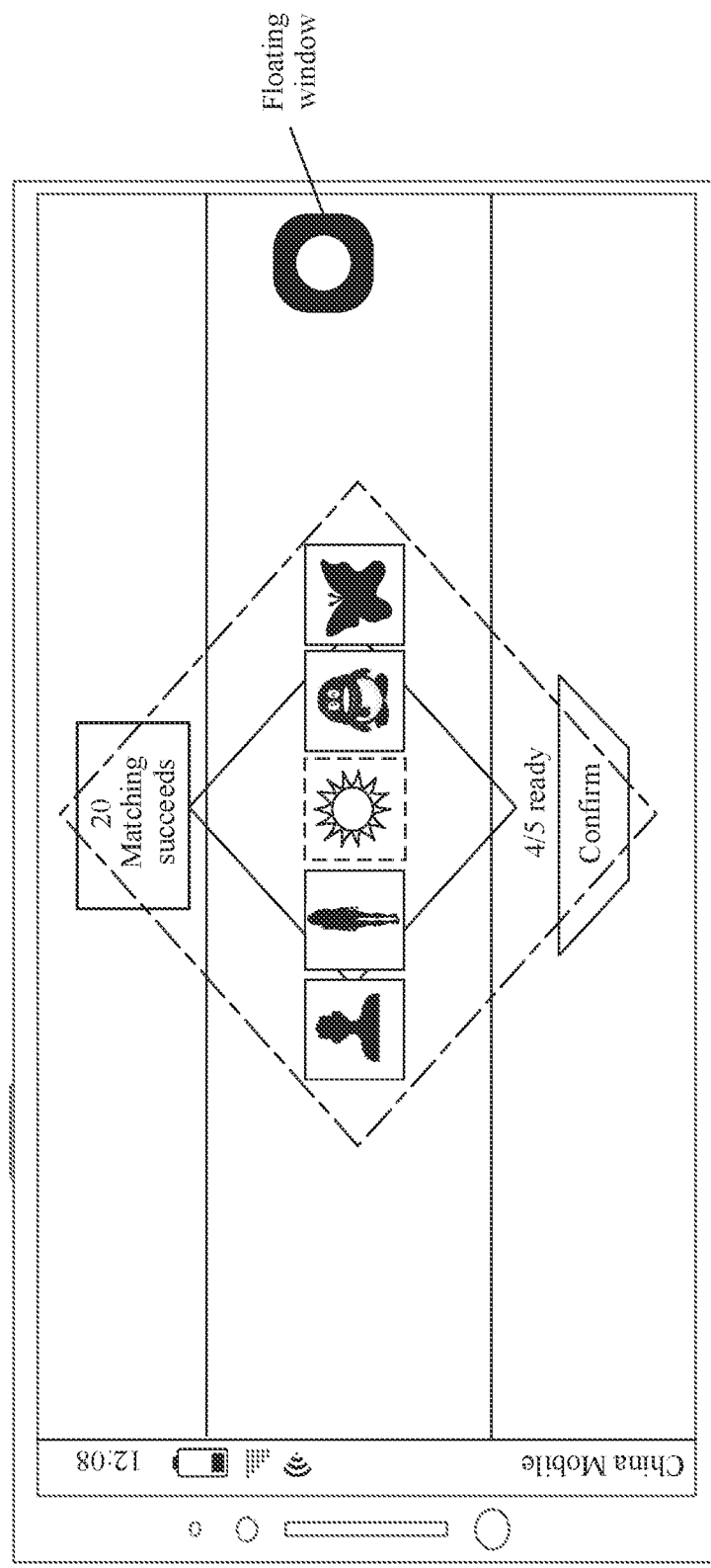
FIG. 7A is a schematic diagram 10 of all example of a display interface of an electronic device according to an embodiment of this application.
Figure 7B:
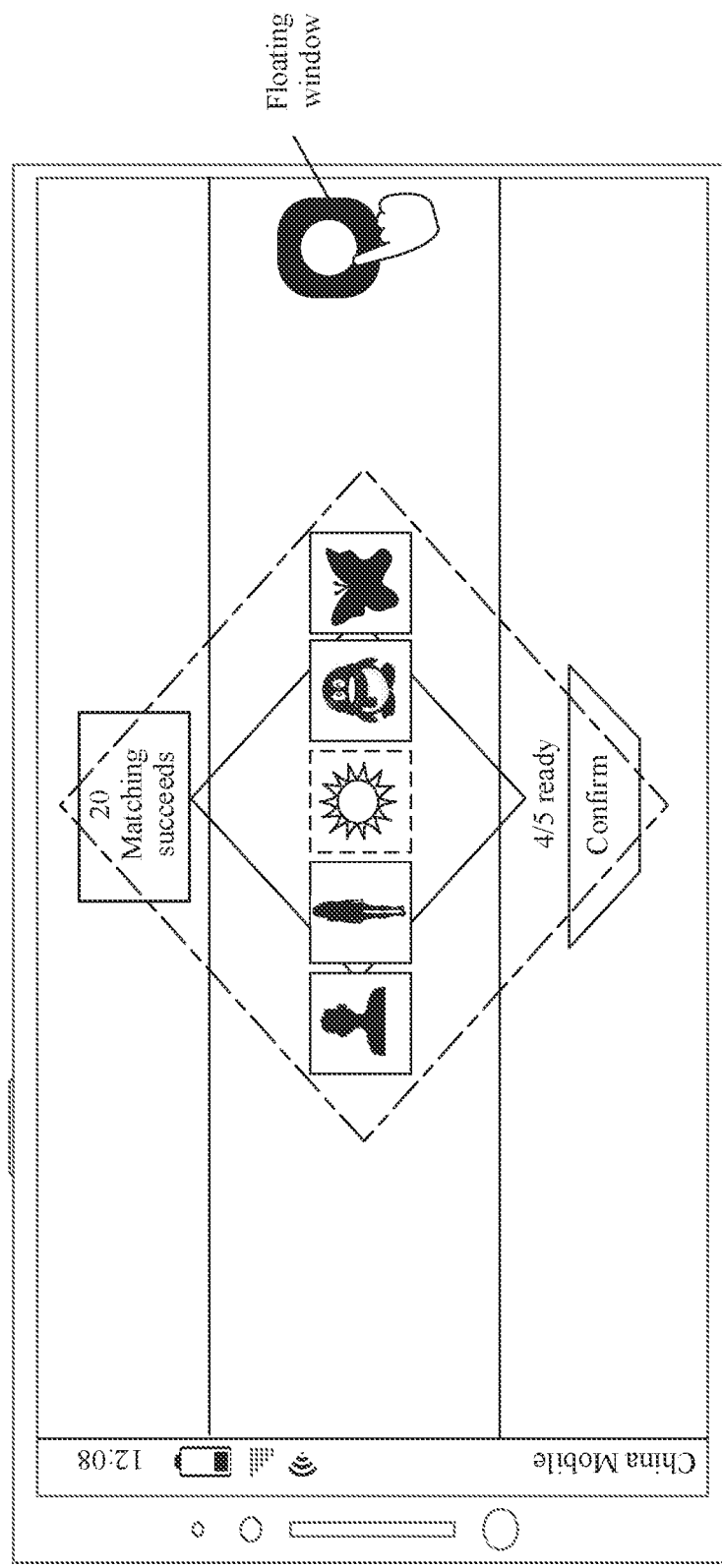
FIG. 7B is a schematic diagram 11 of an example of a display interface of an electronic device according to an embodiment of this application.

For example, as shown in FIG. 7A, when the electronic device displays the first interface of the first application, the first interface includes a floating window, and the floating window is used to enable the function of continuing running in the background. If the user wants to run another service in the foreground while remaining countdown duration of the first application is not suspended in the background, as shown in FIG. 7B, the user may tap the floating window to enable the function of continuing running in the background of the first application, and the electronic device receives the tap operation performed by the user on the floating window.

S604: The electronic device displays information about a second application in response to the first operation.

For example, after the user enables the background running continuing function, the terminal device displays the information about the second application in response to the first operation of the user.

In an implementation, the information about the second application refers to a second interface of the second application. In this implementation, in response to the first operation, the electronic device directly switches the first application to the second application, and displays the second interface of the second application.

In another implementation, the information about the second application refers to an icon of the second application. For example, the electronic device displays the icon of the second application response to the first operation. The icon of the second application may be displayed in a form of prompt information. For example, the electronic device may display third prompt information, where the third prompt information includes the icon of the second application. The third prompt information is used to prompt the user of an application that can be selected. Optionally, the third prompt information may include an icon of at least one application, and the icon of the at least one application includes the icon of the second application.

For example, after receiving the first operation entered by the user in the first interface of the first application, the electronic device displays the icon of the second application in the first interface of the first application in response to the first operation. The icon of the second application may be displayed in a form of prompt information. For example, the electronic device may display third prompt information, where the third prompt information includes the icon of the second application. The third prompt information is used to prompt the user of an application that can be selected. Optionally, the third prompt information may include an icon of at least one application, and the icon of the at least one application includes the icon of the second application.

Figure 7C:
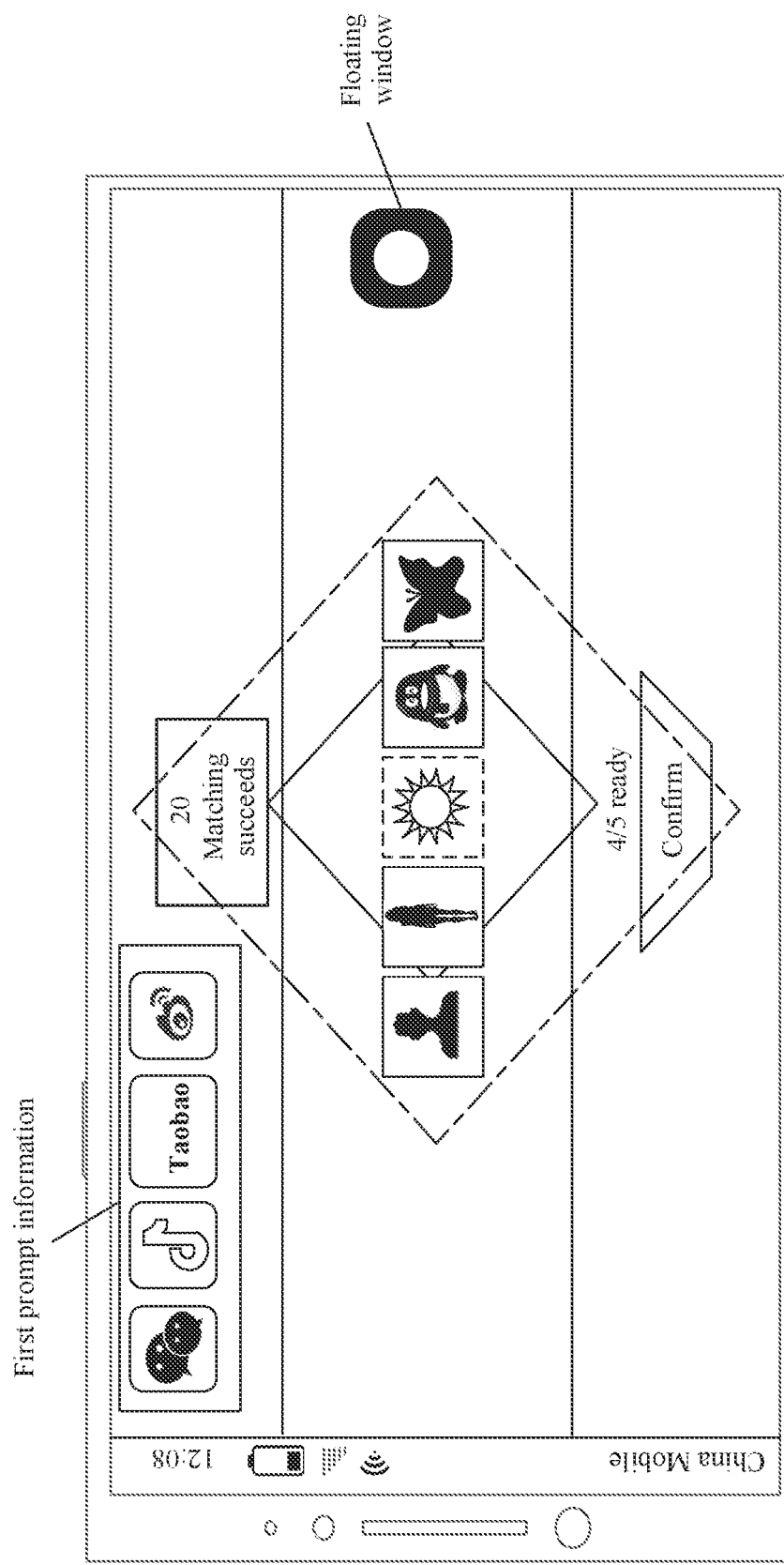
FIG. 7C is a schematic diagram 12 of an example of a display interface of all electronic device according to an embodiment of this application.

For example, with reference to FIG. 7B and FIG. 7C, after the user taps the floating window, the electronic device may display the third prompt information by using a pop-up box in response to the tap operation performed by the user on the floating window. For example, as shown in FIG. 7C, when a current interface of the first application is a waiting interface, the electronic device displays the third prompt information in the first interface of the first application by using a pop-up box in response to the first operation of the user, where the third prompt information includes a "WeChat" icon, a "TikTok" icon, a "Taobao" icon, and a "Weibo" icon.

It may be understood that, in this embodiment, the user enters the first operation to enable the function of continuing running in the background of the first application, displays the information about the second application, and does not need to identify in real time whether the first interface of the first application is the waiting interface. Therefore, compared with the conventional technology in real time identifying whether video content is an advertisement, in this embodiment of this application, overheads of enabling the function of continuing running in the background of the first application are small, and running efficiency and system performance are improved.

Optionally, when the information about the second application refers to the icon of the second application, after step S604, the method may further include: The electronic device receives a selection operation performed by the user on the icon of the second application; and the electronic device displays the second interface of the second application in response to the selection operation of the user. For specific implementations in which the electronic device receives the selection operation performed by the user on the icon of the second application, and the electronic device displays the second interface of the second application in response to the selection operation of the user, refer to related description in step S403. Details are not described herein again.

S605: The electronic device continues running the first application in the background. The running state of the first application in the background is consistent with the running state of the first application in the foreground.

It may be understood that for a specific implementation of step S605, refer to related description in step S404. Details are not described herein again.

Optionally, after steps S601 to S605, the method may further include S606.

S606: The electronic device displays information about the first application when the remaining waiting duration ends.

It may be understood that for a specific implementation of step S606, refer to related description of step S405. Details are not described herein again.

In this embodiment, after waiting time of the first application starts, the first operation of the user is received, and the function of continuing running in the background of the first application is enabled. The electronic device displays the information about the second application in response to the first operation of the user. The electronic device continues running the first application in the background, where the naming state of the first application in the background is consistent with the running state of the first application in the foreground. It may be understood that, in the method in this embodiment of this application, the waiting time of the first application can be fully utilized, thereby improving user time utilization. In addition, after receiving the first operation of the user, the electronic device displays the information about the second application, and may directly switch from an interface of the first application to an interface of the second application, without first switching the interface of the first application to a main interface, and then switching from the main interface to the interface of the second application as in the conventional technology. Therefore, a quantity of interface switching times is small, a user operation is convenient, and user experience is improved.

It should be noted that, different from the foregoing embodiment, in the foregoing embodiment, the start time of the waiting scenario in the first application is obtained by using the first application, and the electronic device displays the information about the second application, and continues running the first application in the background. However, in this embodiment of this application, the user needs to actively trigger a background continuous running process. After the user triggers the first operation, the electronic device displays the information about the second application, and continues running the first application in the background. Compared with the foregoing embodiment, this embodiment has one more step of receiving the first operation of the user.

An embodiment of this application provides the processing method for a waiting scenario in an application. In the method, the electronic device runs the first application, and displays the first interface of the first application, where the first interface includes countdown icon waiting information; the electronic device receives the first operation of the user, where the first operation is used to enable the function of continuing running in the background, and the function of continuing running in the background means that the running state of the first application in the background is consistent with the running state of the first application in the foreground; the electronic device displays the information about the second application in response to the first operation; and the electronic device continues running the first application in the background, where the running state of the first application in the background is consistent with the running state of the first application in the foreground. In this embodiment, by receiving the first operation of the user and displaying the information about the second application, the electronic device may directly switch from the interface of the first application to the interface of the second application, without first switching the interface of the first application to the main interface and switching the main interface to the interface of the second application as in the conventional technology. Therefore, a quantity of interface switching times is small, a user operation is convenient, and user experience is improved. In addition, in this embodiment, when the electronic device runs the first application in the background, the running state of the first application is consistent with the running state of the first application in the foreground, and remaining waiting duration of the first application is not suspended. Therefore, when the second application is urn in the foreground, the remaining waiting duration of the first application may continue performing in the background. Therefore, the waiting duration of the first application can be effectively used, and time utilization of the user is improved.

It can be understood that, to implement the foregoing functions, the electronic device includes a corresponding hardware structure and/or software module for performing each of the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the embodiments of this application.

In the embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division manner in an actual implementation.

Figure 8:
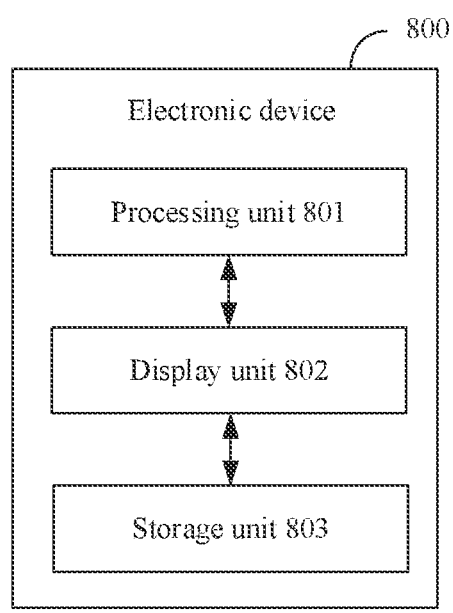
FIG. 8 is a schematic diagram of structure composition of an electronic device according to an embodiment of this application.

When an integrated unit is used, FIG. 8 is a possible schematic diagram of a structure of the electronic device in the foregoing embodiments. The electronic device 800 includes a processing unit 801, a display unit 802, and a storage unit 803.

The processing unit 801 is configured to: control and manage actions of the electronic device 800, for example, may be configured to perform the processing steps of S401 and S404 in FIG. 4, or may be configured to perform the processing steps of S601, S603, and S605 in FIG. 6, and/or may be configured to perform other processes of the techniques described herein.

The display unit 802 is configured to display an interface of the electronic device, for example, may be configured to display a first interface of a first application, for example, may be configured to perform the processing steps of S402, S403, and S405 in FIG. 4, or may be configured to perform the processing steps of S602, S604, and S606 in FIG. 6, and or may be configured to perform other processes of the techniques described herein.

The storage unit 803 is configured to store program code and data of the electronic device 800, for example, may be configured to store a layout file of a desktop.

Certainly, unit modules m the electronic device 800 include but are not limited to the processing unit 801, the display unit 802, and the storage unit 803. For example, the electronic device 800 may further include an audio unit, a communications unit, and the like. The audio unit is configured to collect a voice sent by a user and play the voice. The communications unit is configured to support communication between the electronic device 800 and another apparatus.

The processing unit 801 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The storage unit 303 may be a memory. The audio unit may include a microphone, a speaker, a receiver, and the like. The communications unit may be a transceiver, a transceiver circuit, a communications interface, or the like.

For example, the processing unit 801 is a processor (the processor 110 shown in FIG. 2), and the display unit 802 is a display (the display 194 shown in FIG. 2, where the display 194 may be a touchscreen, and the touchscreen may be integrated with a display panel and a touch panel). The storage unit 803 may be a memory (the internal memory 121 shown in FIG. 2). The audio unit may include a microphone (the microphone 170C shown in FIG. 2), a speaker (the speaker 170A shown in FIG. 2), and a receiver (the receiver 170B shown in FIG. 2). The communications unit includes a mobile communications module (the mobile communications module 150 shown in FIG. 2) and a wireless communications module (the wireless communications module 160 shown in FIG. 2). The mobile communications module and the wireless communications module may be collectively referred to as a communications interface. The electronic device 800 provided in this embodiment of this application may be the electronic device 100 shown in FIG. 2. The processor, the memory, the communications interface, and the like may be coupled together, for example, connected through a bus.

An embodiment of this application further provides a computer storage medium. The computer storage medium stores computer program code, and when the processor executes the computer program code, the electronic device performs related method steps in FIG. 4 or FIG. 6 to implement the method in the foregoing embodiments.

An embodiment of this application further provides a computer program product. When the computer program product runs on a computer, the computer is enabled to perform related method steps in FIG. 4 or FIG. 6 to implement the method in the foregoing embodiments.

The electronic device 800, the computer storage medium, and the computer program product provided in this embodiment of this application each are configured to perform the corresponding method provided above. Therefore, for beneficial effects that can be achieved by the electronic device 800, the computer storage medium, and the computer program product, refer to the beneficial effects in the corresponding method provided above. Details are not described herein again.

The foregoing description about the implementations allows a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in another manner. For example, the described apparatus embodiment is merely an example. For example, the division into the modules or units is merely logical function division, and may be other division in actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A processing method implemented by an electronic device, wherein the processing method comprises:
    running a first application;
    displaying a first interface of the first application, wherein the first interface comprises waiting information;
    receiving, from the first application, a first instruction notifying that waiting of the first application has started;
    displaying first information about a second application based on the first instruction, wherein the first information refers to a second interface of the second application, and wherein the second interface comprises the waiting information; and
    continuing, after displaying the first information, running the first application in a background,
    wherein a first running state of the first application in the background is consistent with a second running state of the first application in a foreground when a remaining waiting duration of the first application is not suspended but continues counting down in the background.

2. The processing method of claim 1, further comprising intercepting a pause command transmitted to the first application.

3. The processing method of claim 1, wherein the first information refers to an icon of the second application, and wherein the processing method further comprises:
    receiving, from a user on the icon, a selection operation; and
    displaying, in response to the selection operation, the second interface of the second application.

4. The processing method of claim 1, further comprising displaying second information about the first application when the remaining waiting duration ends.

5. The processing method of claim 4, wherein the second information refers to a display interface of the first application after the remaining waiting duration ends.

6. The processing method of claim 4, wherein the second information refers to an icon of the first application, and wherein the processing method further comprises:
receiving, from the user, a tap operation on the icon; and
displaying, in response to the tap operation, a display interface of the first application after the remaining waiting duration ends.

7. The processing method of claim 1, wherein the first instruction comprises the remaining waiting duration.

8. The processing method of claim 1, further comprising running the second application in the background.

9. The processing method of claim 1, further comprising avoiding terminating a process corresponding to the first application when the first application runs in the background.

10. The processing method of claim 1, further comprising playing audio information of the first application when the first application runs in the background.

11. The processing method of claim 1, wherein the waiting information comprises a countdown icon, waiting duration text information, or pause information.

12. The processing method of claim 1, further comprising transmitting, to the first application based on the second running state, a second instruction instructing the first application to continue running.

13. The processing method of claim 1, further comprising:
identifying the waiting information in the first interface; and
determining the remaining waiting duration.

14. The processing method of claim 1, wherein a quantity of running times of the second application is greater than a preset threshold.

15. The processing method of claim 1, wherein a running duration of the second application within a preset time is greater than a preset threshold.

16. The processing method of claim 1, wherein the second application is preconfigured in the electronic device.

17. An electronic device comprising:
a memory configured to store a computer program code comprising computer instructions; and
a processor coupled to the memory, wherein when executed by the processor, the computer instructions cause the electronic device to:
run a first application;
display a first interface of the first application, wherein the first interface comprises waiting information;
receive, from the first application, an instruction notifying that waiting of the first application has started;
display information about a second application based on the instruction, wherein the first information refers to a second interface of the second application, and wherein the second interface comprises the waiting information; and
continue, after displaying the information, running the first application in a background,
wherein a first running state of the first application in the background is consistent with a second running state of the first application in a foreground when a remaining waiting duration of the first application is not suspended but continues counting down in the background.

18. The electronic device of claim 17, wherein the waiting information comprises a countdown icon, waiting duration text information, or pause information.

19. The electronic device of claim 17, wherein the second application is preconfigured in the electronic device.

20. A computer program product comprising computer-executable instructions that are stored on a non-transitory computer-readable medium and that, when executed by a processor, cause an electronic device to:
run a first application;
display a first interface of the first application, wherein the first interface comprises waiting information;
receive, from the first application, an instruction notifying that waiting of the first application has started;
display information about a second application based on the instruction, wherein the first information refers to a second interface of the second application, and wherein the second interface comprises the waiting information; and
continue, after displaying the information, running the first application in a background,
wherein a first running state of the first application in the background is consistent with a second running state of the first application in a foreground when a remaining waiting duration of the first application is not suspended but continues counting down in the background.

* * * * *

UNITED STATES PATENT AND TRADEMARK OFFICE
CERTIFICATE OF CORRECTION

| | |
|---|---|
| PATENT NO. | : 11,921,977 B2 |
| APPLICATION NO. | : 17/623425 |
| DATED | : March 5, 2024 |
| INVENTOR(S) | : Wei Li and Xinghai Wei |

It is certified that error appears in the above-identified patent and that said Letters Patent is hereby corrected as shown below:

On the Title Page

Page 2, (56) References Cited, Foreign Patent Documents: "IN 109379337 A 2/2019" should read "CN 109379337 A 2/2019"

Signed and Sealed this
Thirtieth Day of April, 2024

Katherine Kelly Vidal
*Director of the United States Patent and Trademark Office*